United States Patent [19]
Brett

[11] Patent Number: 6,075,887
[45] Date of Patent: *Jun. 13, 2000

[54] HIGH DEFINITION COLOR MODIFICATION

[75] Inventor: Steven Brett, Kent, United Kingdom

[73] Assignee: Pandora International Ltd., Northfleet, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/317,329

[22] Filed: Oct. 4, 1994

Related U.S. Application Data

[63] Continuation-in-part of application No. 08/045,560, Apr. 9, 1993, Pat. No. 5,450,500.

[30] Foreign Application Priority Data

Oct. 4, 1993 [GB] United Kingdom .................... 9320412

[51] Int. Cl.[7] ...................................................... G06K 9/00
[52] U.S. Cl. ................................ 382/167; 386/37; 348/96
[58] Field of Search ..................................... 382/162, 167; 358/518, 520, 523, 524; 345/150, 152, 153; 386/2, 37, 47, 123; 348/612, 617, 621, 624, 650, 652, 96, 101, 103, 104, 106, 439, 445, 700, 701; 396/311

[56] References Cited

U.S. PATENT DOCUMENTS

| | | | |
|---|---|---|---|
| 4,935,809 | 6/1990 | Hayashi et al. ......................... | 358/524 |
| 5,051,928 | 9/1991 | Gruters ..................................... | 345/150 |
| 5,295,204 | 3/1994 | Parulski .................................. | 382/167 |
| 5,327,247 | 7/1994 | Osborne et al. ........................ | 348/100 |
| 5,373,375 | 12/1994 | Weldy ..................................... | 358/523 |
| 5,442,715 | 8/1995 | Gaborski et al. ....................... | 382/187 |

FOREIGN PATENT DOCUMENTS 2243264A 10/1991 United Kingdom ............. H04N 3/36

*Primary Examiner*—Amelia Au
*Assistant Examiner*—Timothy M. Johnson
*Attorney, Agent, or Firm*—McDonnell Boehnen Hulbert & Berghoff

[57] ABSTRACT

There is provided a method of applying colour correction to a video image obtained by scanning photographic film frames, in which each frame on the film is scanned a plurality of times to produce a plurality of constituent frames each containing only part of the data required to represent the image at a relatively high resolution, the constituent frames associated with each film frame are assembled to provide a relatively high resolution video image, and the high resolution images are stored and/or displayed. In the invention, information is stored indicating the relationship between each constituent frame and its associated high resolution image, a colour correction decision is made, and colour correction is applied to one or more of the constituent frames associated with that high resolution image.

31 Claims, 12 Drawing Sheets

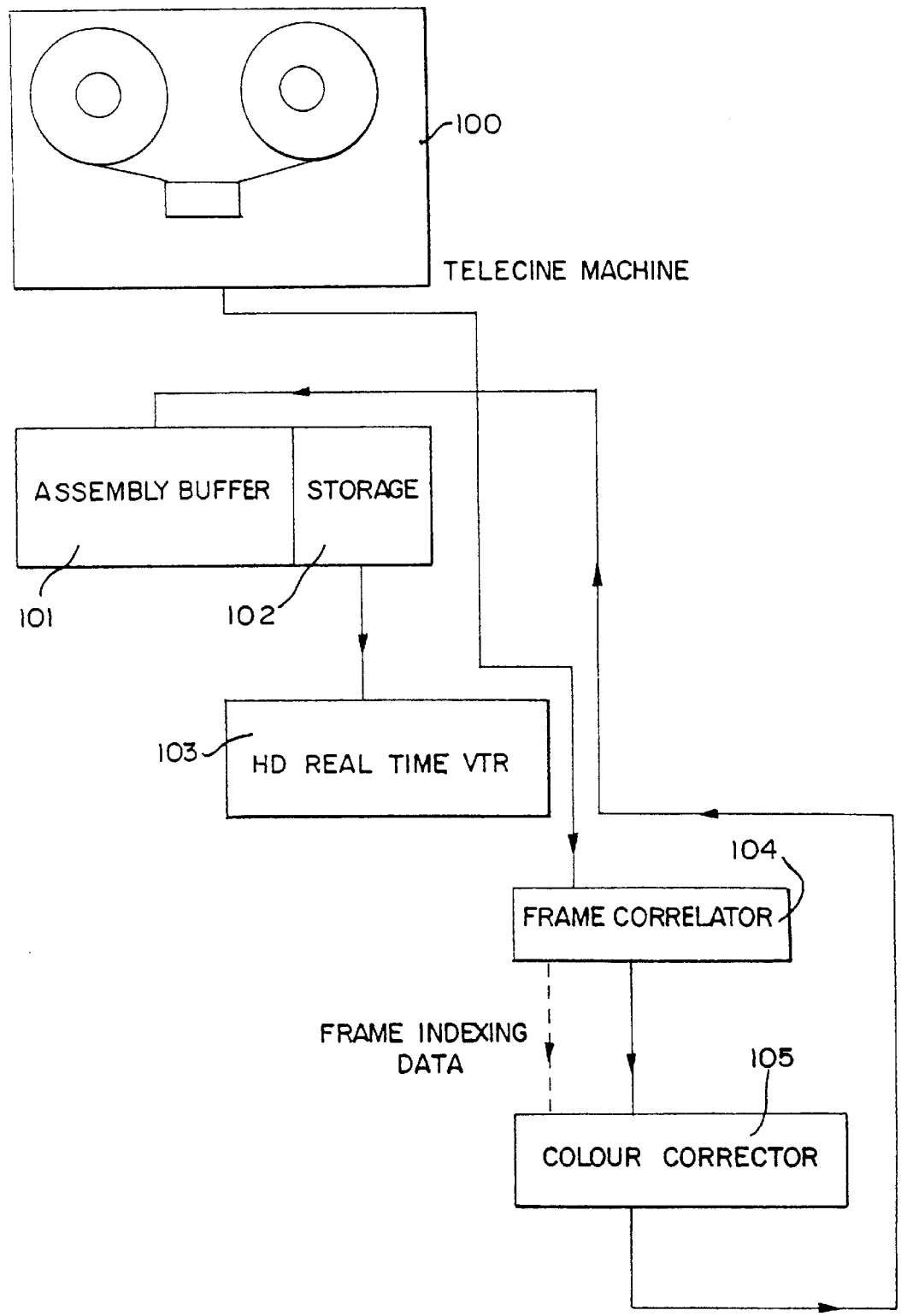
FIG. 1 TELECINE MACHINE IN HIGH DEFINITION NON-REAL TIME WITH REASSEMBLY BUFFER AND COLOUR CORRECTIOR

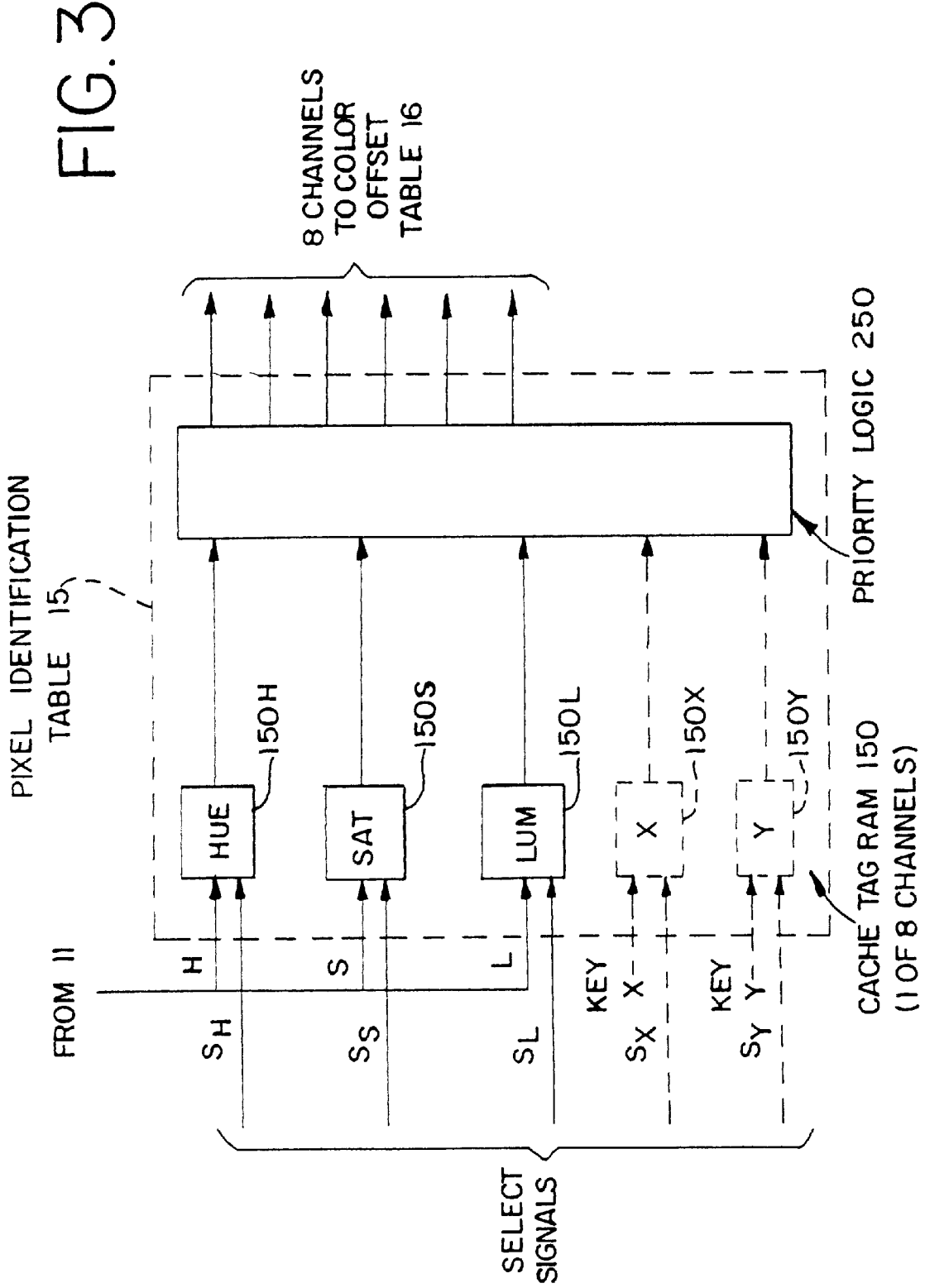

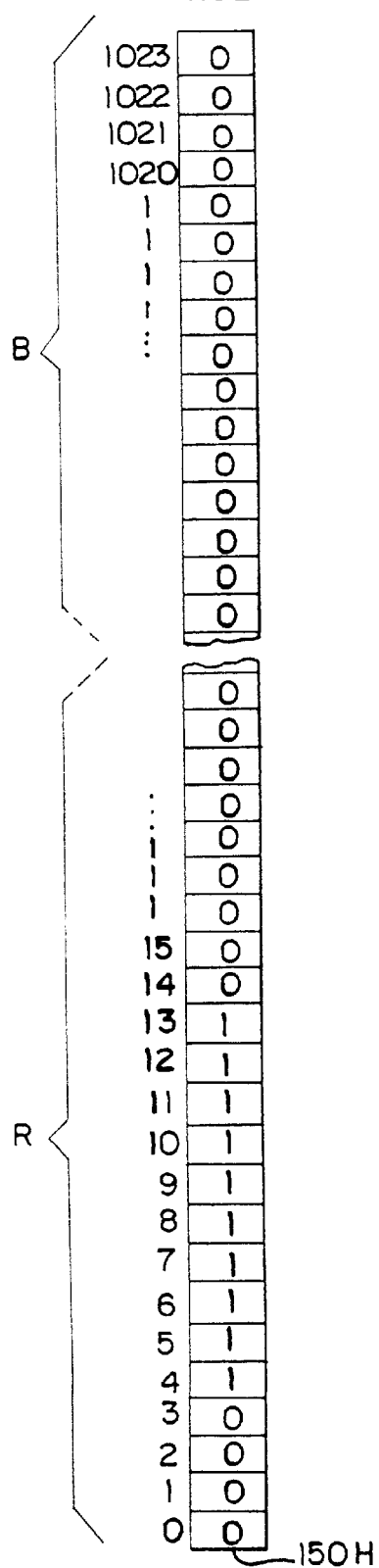
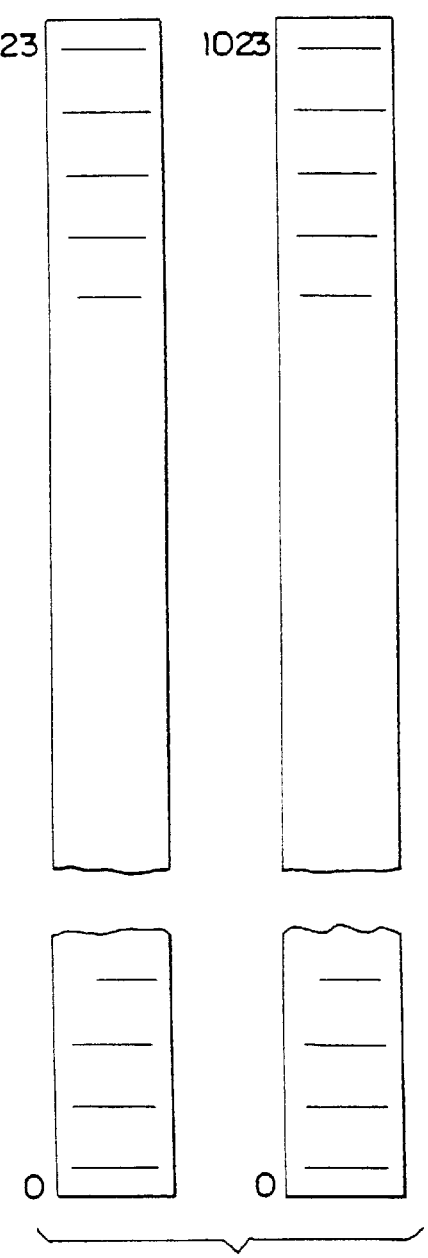

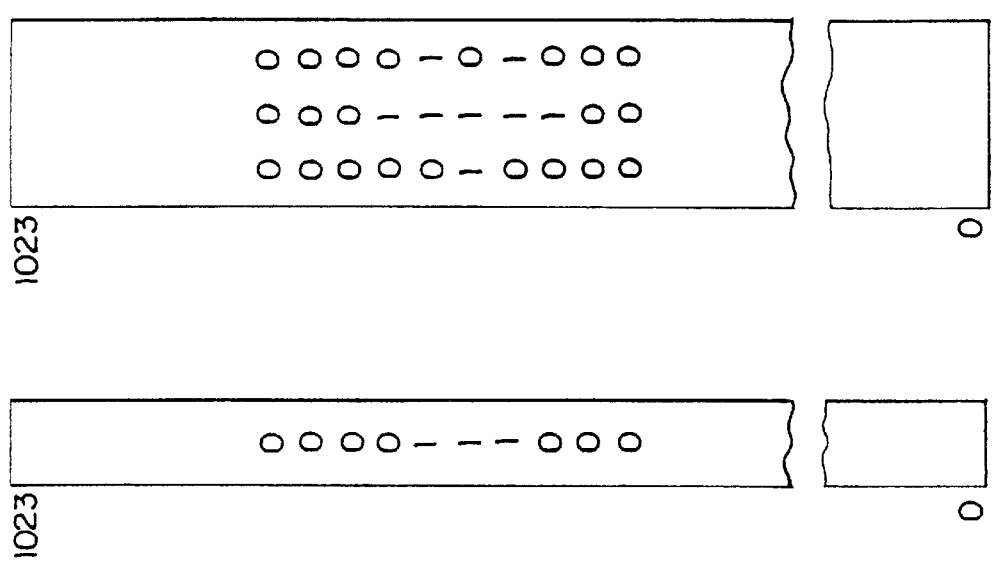

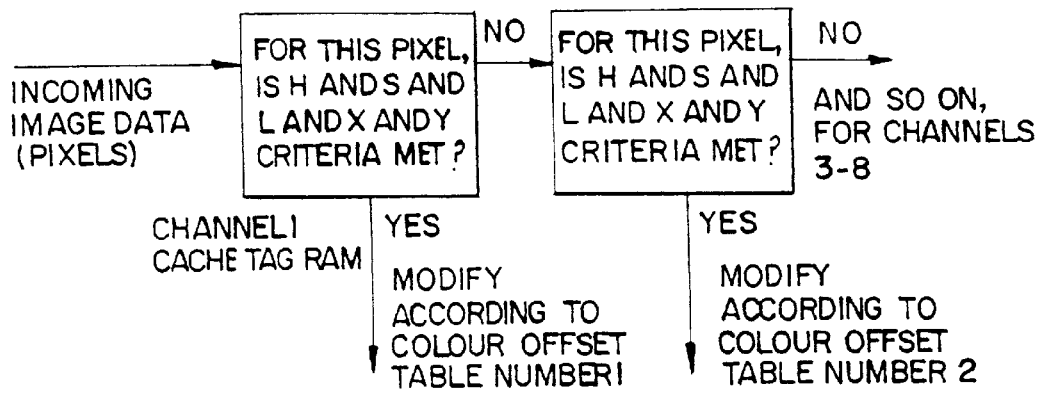
FIG. 8 CHANNEL PRIORITY LOGIC
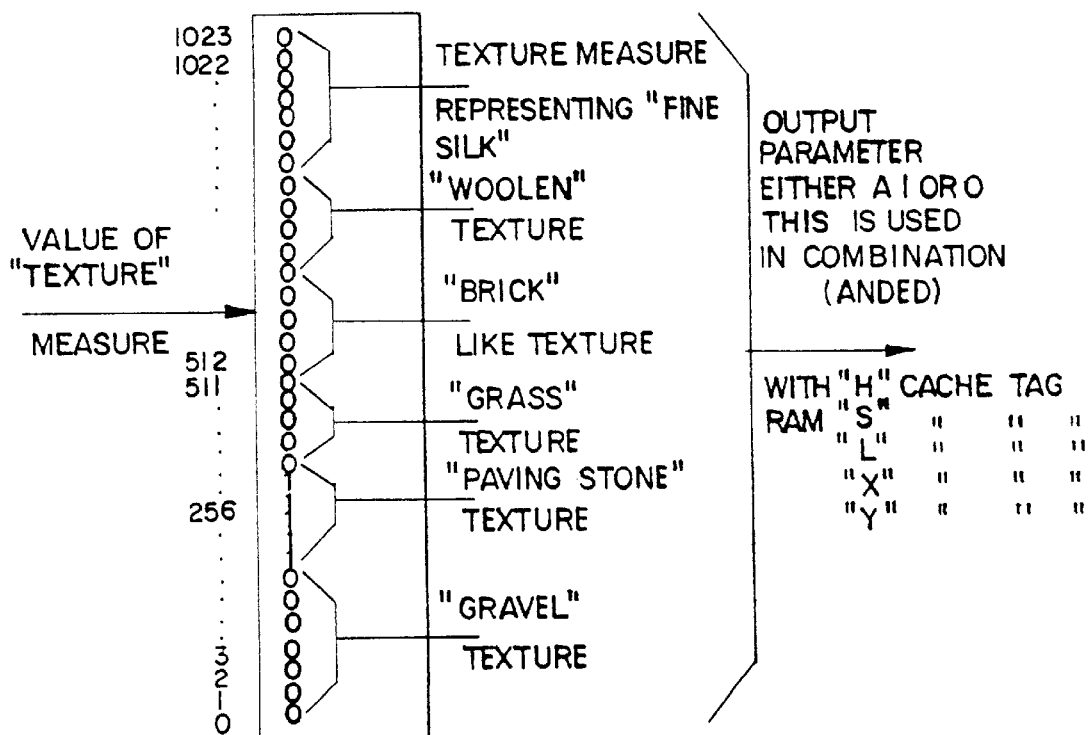
FIG. 9
TEXTURE AS A CACHE TAG RAM PARAMETER

FIG.15 THE CARD RACK

HIGH DEFINITION COLOR MODIFICATION

CROSS-REFERENCE TO RELATED APPLICATIONS

This is a continuation-in-part of U.S. Ser. No. 08/045,560 filed Apr. 9, 1993, now U.S. Pat. No. 5,450,500.

BACKGROUND OF THE INVENTION

1. Field of the Invention

This invention relates to high definition colour correction, for example used in conjunction with telecine scanning equipment.

2. Description of Related Art

There are known machines specifically designed to transfer images on film to electrical signals which can be used either for broadcasting or for capturing onto video tape. These machines are known as telecine machines. Examples of such machines are the Rank Cintel URSA machine, or the FDL90 machine as manufactured by Broadcast Television Systems (known as BTS) in Germany.

These machines quite often have associated systems known as colour correctors. These correctors take the resultant electrical systems from the telecine machine and process or alter some or all of the colours in the pictures. For example, such a system would be able to manipulate the red coloured areas in a scene, but leave the rest of the colours in the picture unaltered. A number of such machines exits, including the DCP manufactured by Pandora International of Kent, England or the Da Vinci Renaissance System, manufactured by Colorgraphics of Fort Lauderdale, Fla., USA.

It is normal to use a telecine machine and colour corrector in a 'rehearse and playback' mode, under the control of a 'programmer'. In this mode of operation there is first 'reharsed' the grading of the film. This is typically done by running the film through the telecine, and identifying scene start and end points. Then representative frames are chosen from each scene, the telecine is stopped on the selected frames representative of the scene, and time is spent optimising the grading for that frame. This is then repeated for the remaining scenes of the film. The function of the system is to record in a computer type memory the scene change points, and also the settings of grading for each of the scenes. After the 'grading' pass has finished, the film is then transferred to videotape, at normal viewing rate (25 frames per second). In this 'playback' mode the programmer uses the vertical interval of the video system format to change the grading settings, ready for the new scene if necessary. This scene by scene colour correction is taught in U.S. Pat. No. 4,096,523 of Armand Belmares-Sarabia et al.

Currently, such telecine machines produce pictures of the same resolution as is currently broadcast, namely 525 line pictures in the North American territories, and 625 line pictures in Europe and other areas. These broadcast standards require respectively the production of 30 frames per second or 25 frames per second. The present telecine machines are capable of working in what is referred to as 'real time'. This means that pictures can be produced at the same rate as broadcast.

There have been for many years experimental telecine systems that have produced 'High Definition' pictures. These are typically 1250 line pictures in European areas and 1125 or 1050 line pictures in North America.

The data rate for such systems operating in real time is significantly higher than a 'standard' definition system. Although this presents problems in the electronics areas, by careful design and high cost this can be overcome. Typically, this increase in data rate is about five times, as there are approximately five times as many pixels in a high definition picture as in a standard definition one.

FB-A-2 243 264 of Rank Cintel discloses a proposal to overcome this difficulty by operating the telecine at a standard definition rate, and to take therefore approximately five times as long to produce one scanned picture of High Definition than of standard definition. The document covers techniques including 'sectioning' a high definition frame into several standard definition frames, and also techniques for 'interleaving' pixels in typically a 2×2 pattern between the four (nominal) standard definition scans.

In some modes of implementation, the telecine may have a 'reconstituting' store in it, together with many frames of storage. This allows the non-real time transfer to film material, in which the separate standard definition data rate pictures are assembled into a High definition buffer, and from there stored into a multi frame buffer to build up a sequence of many seconds of video in High definition. This can then be 'downloaded' in real time bursts of e.g. 20–30 seconds to a real time high definition video tape recorder.

SUMMARY OF THE INVENTION

Whilst the Rank Cintel specification discloses techniques for solving the problem at the telecine machine, this does not solve the problem 'downstream'. It is important to realise that the Telecine machine is only one element in a processing chain, and that the overall chain needs to work to make financial success for its users. The present invention is concerned with the use of a colour correction technique in the chain.

According to one inventive aspect of the present disclosure, there is provided a method of applying colour correction to a video image obtained by scanning photographic film frames, in which each frame on the film is scanned a plurality of times to produce a plurality of constituent frames each containing only part of the data required to represent the image at a relatively high resolution, the constituent frames associated with each film frame are assembled to provide a relatively high resolution video image, and the high resolution images are (i) stored, (ii) displayed, or (iii) stored and displayed wherein information is stored indicating the relationship between each constituent frame and its associated high resolution image, a colour correction decision is made, and colour correction is applied to one or more of the constituent frames associated with that high resolution image.

The colour correction decision could be made on a high definition monitor, on the basis of the high resolution image. However, it would be possible to scan the film an additional time—normally before the multiple scans referred to above—to produce a standard resolution frame which is displayed on a lower definition monitor. The colour correction decisions would then be made, following which the above procedure would be carried out to produce the colour corrected high resolution image. During this period an operator need not be in attendance as the decisions have already been made in real time using the standard definition scan and monitor. An advantage of this route is that it is not necessary to have a high definition monitor, thus reducing costs.

A significant advantage of the present invention is that it is not necessary to use an expensive high resolution colour corrector. Instead, a standard colour corrector can be used, with significant savings in costs.

The constituent frames may be obtained by dividing the film frame image into a plurality of sections and scanning each section. Each frame will contain the full number of pixels required to produce a high resolution image of its section, but that number will of course be a fraction of the total number of pixels required to form the complete high resolution image, depending upon the number of sections which typically may be four. A typical arrangement would be to divide the picture into top left, top right, bottom left and bottom right.

Alternatively, the constituent frames may be obtained by scanning across the entire image but in an interleaved fashion. Thus one scan may take in odd lines and odd pixels; the next odd lines and even pixels; the next even lines and odd pixels; and the final scan even lines and even pixels.

Where a colour correction is required over the whole of an image, then this is possible with either technique and all of the constituent frames will be identified and colour corrected. In the case of the interleaved system, it might be possible to obtain special effects by applying the correction to less than the full number of frames or even by applying different corrections to different frames.

By using combinations of breaking into blocks and interleaving, special effects may be obtained.

In the case of the system in which the film frame image is divided into sections, it is possible to adjust the colour in one of the sections but not in others, or again to adjust different sections differently. For example, it may be desired to alter the reds in the top left hand corner of a picture, without altering the others. To enable this it is necessary to record not only that a constituent frame is associated with a particular image but also its position. Typically, the values for a picture element will be stored as three eight or ten bit numbers, representing the numerical magnitude of the red, green and blue components. By adding a further two bits a picture element can be associated with one of four picture quarters.

In general there will be a new picture synchronisation pulse and a remapping table which will correlate the location in a picture stream of a high definition picture in terms of its constituent frames.

As far as the colour correction module is concerned, it is receiving video signals in what it considers as a standard rather than high definition form. It operates on the constituent frames rather than the high resolution image which is produced after these have been assembled. Thus, in a system using a telecine machine and an assembly buffer, the frame correlator and the colour corrector will be positioned between the telecine machine and the buffer. The output from the colour corrector is stored in the buffer.

The principal use for the system described above is in the field of high definition broadcast pictures having e.g. 1250, 1125 or 1050 lines as mentioned above. Thus a typical high resolution image will be 1800×1125 pixels as opposed to a "standard" resolution of 700×500 pixels. However, another use is in the field of processing "film resolution" images. These may have 4000×3000 pixels, and instead of the relationship of say 4 or 5 constituent frames there may be about 36 (6×6) constituent frames to one film quality frame.

It is often desired to track objects as they move between frames. For example, there may be an instance where a red car drives across the top of a picture but there is also a red car parked in the top left which would confuse viewers. It is thus decided to change the colour of the moving car to blue. It possible to do this and there are techniques available which will allow an object to be followed from one frame to the next. To deal with this in combination with the present invention it will be necessary to have an extension to the addressing logic in the frame correlator. In real terms, the car will move from the top left of one high definition picture to the top right of the next. However, if the image is divided into four quarters, for example, the correlator will have to find the constituent frame for the top left quarter in one frame and the top right in the next.

As regards the colour correlator module itself, in a preferred embodiment this has novel features also.

According to one important feature of the correlator, only pixels that are specifically selected to be modified are processed by the digital circuitry. The pixels that are not to be modified are passed through the digital colour processor ("DCP") without any processing that could create rounding or other errors.

By contrast, in a conventional architecture, all of the pixels in the picture would be processed through the same signal modification path, possibly being converted from red, green and blue (RGB) to hue, saturation and luminance (HSL), and then back again to RGB, causing errors.

Pixel selection advantageously is carried out by using the architecture referred to below as the "pixel identification table" or alternatively as the "cache tag RAM". The pixel identification table stores digital bits which define which pixels will be selected from the pixel stream for modification. Pixels may be selected as a function of their color (hue) as in prior systems, and/or as a function of other criteria, such as saturation, luminance, (X,Y) pixel coordinates, sharpness, and texture.

Further, after a pixel or region to be changed has been isolated, other parameters besides (H,S,L), color attributes can be changed. For example, the sharpness or even the (X,Y) coordinates of a region can be changed. Modifying the (x,y) coordinates of a region would be useful, for example, for special effects such as moving an object in the picture. Detecting pixels according to their (X,Y) coordinates could also be useful for copying pixels at a given x,y from one frame to another for scratch concealment. The latter process might be carried out simply by, for the given X,Y, controlling the frame store of the DCP (discussed below), so that those specific pixels are not overwritten from frame to frame.

According to another important feature, a very minute modification will be disregarded and not applied to the input signal, since such a minute modification may be an inadvertent mathematical error.

The preferred DCP avoids the problem of discontinuities as well. The known digital color correctors process one picture element (pixel) at a time, and have no knowledge of picture elements adjacent to the element being processed. For example, brightening an actor's lips by simply intensifying the reds will result in bright shimmering spots on the lips, since in practice not all of the pixels in the original lips are of equal saturation and luminance, nor are they all red. The DCP preferably has a first convolver which has knowledge of preceding and following pixels on that line, and also neighboring picture elements on preceding and following lines. By convolving the adjacent pixels in the actual picture, including unmodified pixels, the first convolver can provide gradual transitions. Advantageously, a second convolver receives just the R, G, and B modification values of the pixels that are to be modified. Both convolvers preferably perform a mathematical 3×3, 5×5, or similar convolution on the array of picture elements.

The convolvers afford a more gradual change from "unmodified" to "modified" signals, thus removing any discontinuity. The disclosed scheme smooths out both the modification increments between adjacent modified pixels, and transitions between the resulting pixels as displayed, including transitions between modified and unmodified pixels.

Thus, there are two levels of convolution in the DCP. The first convolver modifies the boundaries between selected and not-selected regions. The second convolver selectively modifies parts of the picture, in response to any or all of the selection criteria that the DCP can detect and respond to. For example, if an original picture contains a region where the color gradually transitions from red to green, and if it is desired to alter the reds but not the greens, there will be transition problems on two levels. The first level will be referred to as the "macro" level. After a substantial adjustment of the reds, a line will be clearly visible between the reds and the (unmodified) greens, rather than a gradual transition. The first convolver addresses this problem by processing both modified and unmodified pixels to smooth out the macro transition effect. There will also be a discontinuity on a "micro" level. Film is made up of grains, or more precisely dye clouds, which have fixed colors. The apparent change of color in the original picture corresponds to a decreasing density of red grains during the transition into the green region. However, with the present arrangement, it is possible to pick out individual film grains and change them. This type of modification is not usually desirable. It will cause a visible lack of smoothness in the transition from the red region into the green region, because in that transition area the DCP will select and modify half the grains, but not the other half. The second convolver addresses that "micro" problem. It smooths out the color by converting a collection of red and green grains into an even mixed color, to prevent the poor appearance which results from changing only some of the pixels in the transition region.

Another advantageous feature of the preferred DCP is its capacity to provide a "wash mode." As an example, it might be desirable to select a light grey sky (i.e. of indeterminate hue) to be made blue. It might be impossible to hue-identify the region with conventional equipment, as a grey region would contain either no hue, or a wide variety of low-saturation red, green, and blue film "grains". Increasing the saturation of such a region would make the sky resemble a sea of multi-colored golf balls. However, with the DCP a light grey sky might be picked up not by its hue, but by looking for high luminance. Having located this area, it would be possible to entirely discard the original hue of the sky, and paint in a new hue, of constant blue. This would not look artificial, as picture detail in the sky would still be provided by the luminance and saturation components.

The system is also capable of other wash modes, such as saturation wash. A saturation wash might be desirable if it were desired to take a normal picture containing a normal range of hues and modify it to contain only sepia hues. It is useful to explain this example in order to illustrate the operation of the DCP. In red, green and blue color space, higher value mean more color. That is, full R+G+B equals white, zero R+G+B equals black, and equal amounts of R+G+B represents various shades of neutral. When dealing with H, S and L, however, we are in a cylindrical polar color space. The axis of the cylinder defines the neutrals. The bottom of the axis represents black and the top of the axis represents white. All points on the axis have a luminance value, zero saturation, and an undefined hue. Saturation corresponds to the radial distance from the axis. The hue H represents the angle travelled around the axis, before travelling a distance S out from the axis to define a saturation. The angle of rotation around the axis is meaningless if the color in question is still at the axis; therefore, the neutrals (black, grey, white) along the axis have an undefined hue.

The normal starting picture has a full range of colors, including neutrals. It would be impossible to use the "hue wash" process to add sepia hue (a middle-brown hue) to a neutral pixel, because even if sepia hue were added, the saturation would still be zero (recall that all neutral colors have zero saturation), so the pixel would still appear neutral, i.e., grey.

To solve this problem, rather than first modifying hue, the DCP first modifies all the saturation values in the picture and replaces them with a constant non-zero saturation value, i.e., a saturation wash. After this step, all the pixels will now be colored and none will be grey any longer. All the pixels will now have a hue. The second step is a hue wash, in which the hue value of every pixel is replaced with a fixed sepia hue.

Although this process discards two of the three parameters for each pixel, hue and saturation, most of the picture information is still present, because the luminance parameter is unmodified.

A luminance wash can also be performed in an analogous way, and might be useful for special effects.

In summary, the disclosed architecture of the DCP has, among others, the following important features:

1. An architecture where only the pixels and/or regions to be modified have any processing applied to them.
2. An advantageous way of identifying pixels and/or regions to be modified and not to be modified.
3. A multi-channel approach with precedence logic to meet any possible user requirements.
4. Image modification circuitry wherein minute modifications are automatically disregarded, thereby preventing any small mathematical errors from inadvertently affecting the image.
5. Wash mode capability for permitting new forms of artistic creatively.

BRIEF DESCRIPTION OF THE DRAWINGS

Some embodiments of the invention will now be described in more detail and with reference to the accompanying drawings in which:

FIG. 1 is a diagram showing the basic layout of a system in accordance with the present invention.

FIG. 3 is a block diagram showing the pixel identification table of the DCT.

FIG. 4 schematically shows the arrangement of a cache tag RAM for hue in the pixel identification table of FIG. 3.

FIG. 5 schematically shows the arrangement of cache tag RAMs for X and Y coordinates in the pixel identification table in FIG. 4.

FIGS. 6A and 6B show a side-by-side comparison of a cache tag RAM containing one bit at each memory location versus a cache tag RAM containing 3-bits at each memory location.

FIG. 7 is a schematic illustration of a cache tag RAM for hue values, showing a RAM divided into eight channels, each channel being arranged for storing data bits corresponding to a respective set or range of hue values.

FIG. 8 is a flow chart illustrating the channel priority logic in the pixel identification table of FIG. 2.

FIG. 9 is a schematic diagram showing the use of a cache tag RAM to store selection criteria corresponding to video textures.

DESCRIPTION OF THE PREFERRED EMBODIMENT

Figure 2A:
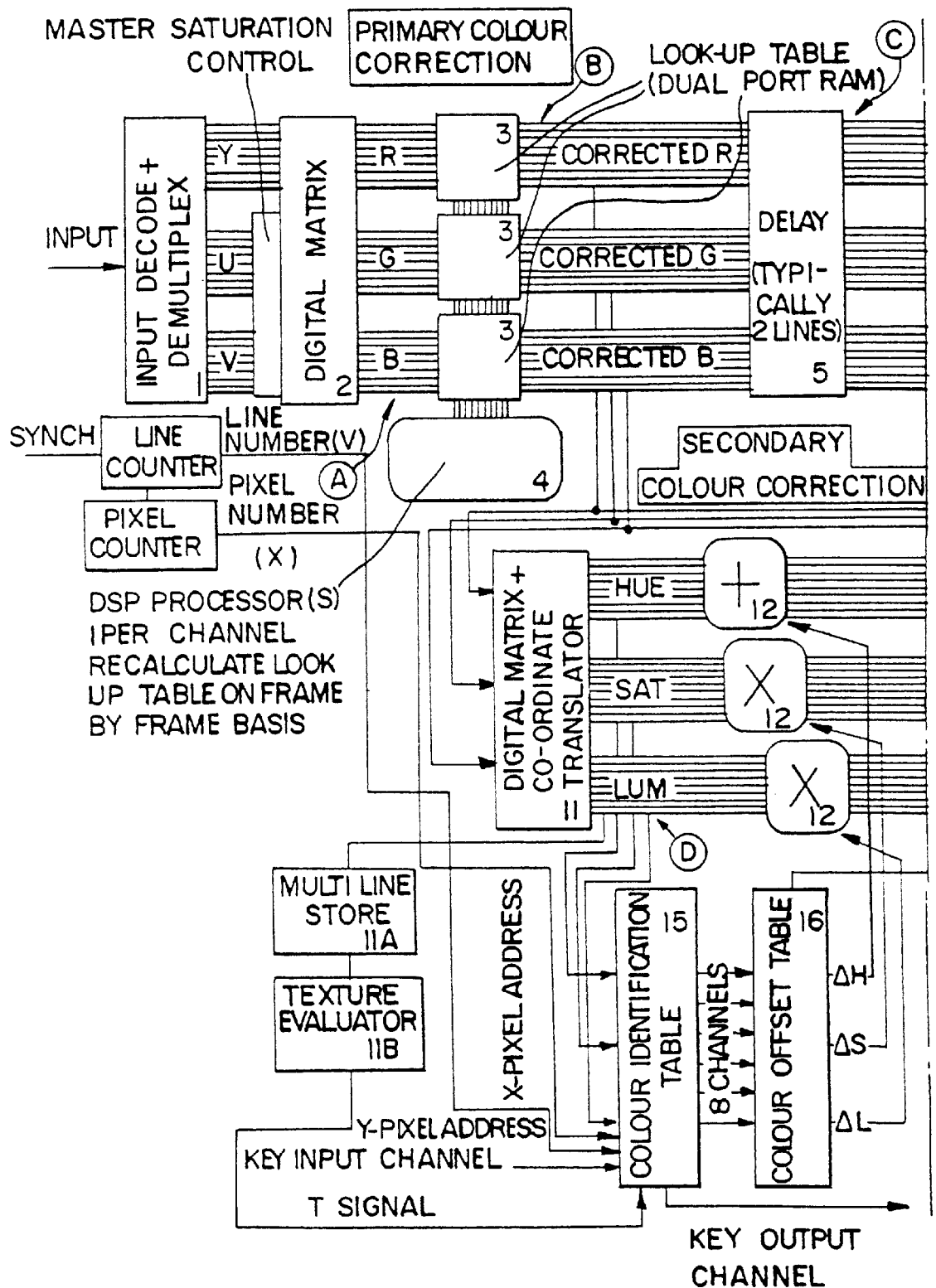
FIGS. 2A and 2B together constitute a block diagram showing a preferred digital color processor (DCP) for use in the system.

FIG. 1 shows diagrammatically how a colour correction technique as described above may be put into effect. Thus, there is shown a telecine machine 100 with an assembly buffer 101 and storage module 102, which may of the Rank Cintel type described earlier. This produces bursts of high resolution video (such as 20–30 second clips) to a high definition real time tape recorder 103 or any other suitable storage device, or of course to a high definition monitor. Between the telecine machine and the assembly buffer is positioned the frame correlator 104 and the colour correction module 105.

The modules work together in the manner described above. In particular, the frame correlator keeps a logged record of high definition frames and the corresponding constituent standard definition sub-frames. Thus, each film frame will have four scanned corresponding sub-frames at standard definition, which will be recombined to make a high definition video frame corresponding to the film frame. The correlator will include for example a general purpose microprocessor and RAM to store the correlation. A typical example is shown in the table below.

| SCENE NUMBER | FILM FRAME | SCAN NUMBER | QUARTERED FLAG |
|---|---|---|---|
| 1 | 1 | 1 | X |
|   |   | 2 |   |
|   |   | 3 |   |
|   |   | 4 |   |
|   | 2 | 5 |   |
|   |   | 6 |   |
|   |   | 7 |   |
|   |   | 8 |   |
|   | 3 | 9 |   |
|   |   | 10 |   |
|   |   | 11 |   |
|   |   | 12 |   |
|   | 4 | 13 |   |
|   |   | 14 |   |
|   |   | 15 |   |
|   |   | 16 |   |

This table thus identifies the scene which the operator is working with, the sub frames and the high definition frames.

There is also a flag to indicate that the system is in "quartered" mode as opposed to interleaved mode.

By way of example, consider an operator handling two scenes. The first has twenty frames and the second fifty. In a conventional system there would be stored, in the programmer, the fact that there are two scenes, one of twenty frames and one of fifty frames. In accordance with the preset invention, however, the frame correlator establishes that the system is in quartered mode and that the "multiplier" (of standard frames to HD frames) is four. The correlator will therefore determine and store the sub-frames using this information. In this example, it will know that sub frames 1 to 80 are for the first scene and sub-frames 81 to 280 are the sub frames for the second scene.

Suppose that there is a scene thirty frames long, and that there is a red object in one corner which should be blue. Assuming that the correlator knows the order in which the sub-frames are scanned, it can determine which sub-frames have to be corrected. In this case, it could be sub-frames 1,3,5,7 and so forth. Thus, these frames can be selected and the colour corrected.

This system has an advantage that less data is given to the colour corrector and thus less computation is required. A further advantage is that there is less chance of rounding errors affecting the quality of the picture.

As regards the arrangement of the colour corrector itself, this will now be described in more detail. Whilst the system will work with a variety of colour correctors, whether digital or analogue, it is preferred that it be used in conjunction with a corrector having novel features.

The DCP disclosed herein is an advanced, multi-functional all-digital color corrector. The inputs and outputs of the DCP are preferably 10-bit digital RGB signals, that is, with ten bits used to describe each of the input red, green, and blue signals.

All components are standard. All functions and timing of the disclosed components are controlled by a Motorola 56000 (or 58000) series microprocessor using conventional techniques.

The following line standards will be supported:

| Lines | Hz | Pixels/Line | Clock (MHz) |
|---|---|---|---|
| 525 | 59.94 | 720 | 13.5 |
| 625 | 50 | 720 | 13.5 |

Internal calculations will be carried out at 16-bit accuracy, which will prevent rounding errors; the results will be rounded to 10-bits at the final stage of the signal modification path.

Hue can be modified throughout a full 360° range in the cylindrical color space. Saturation and luminance can be varied from 0 to 400%. Hue, saturation and luminance can be selected with 10-bit accuracy.

Preferably, according to a preferred embodiment of the invention, digital video information is decoded and demultiplexed by means of a decoder/demultiplexer such as a standard gate array logic, or an ASIC (element 1 in FIG. 2A, or any other conventional circuit which is able to provide a 10-bit Y/Cr/Cb (YUV) data input. This signal is converted by a digital multiplication matrix 2 to provide RGB data. By changing the coefficients within the matrix, master saturation and luminance controls are provided.

The main microprocessor control channel which runs through the backplane of the system will use BTL drive logic similar to those devices specified for Futurebus. This is desirable in order to achieve the required speed and fanout. Active bus termination will be employed at each end of the Backplane.

"Resolution" refers herein to the spatial resolution between lines, or pixels within a line; while "pixel depth" refers to the number of bits per pixel. The pixel depth, i.e., bits per pixel, is 10 bits (1,024 levels).

Figure 2B:
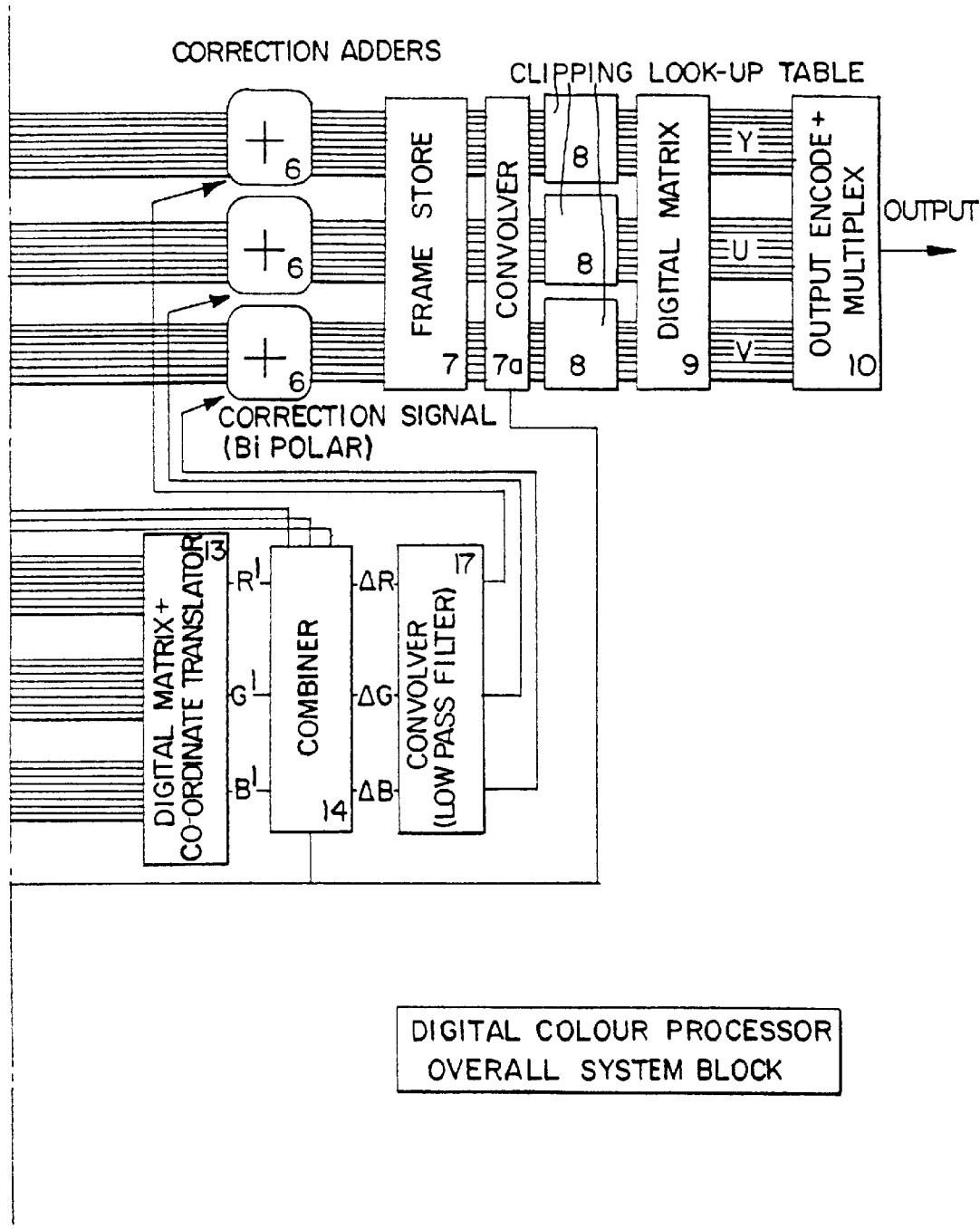

A block diagram of the DCP is shown in FIGS. 2A and 2B. A primary signal processing path transmits the input signals to the outputs. A secondary path forms a bypass off of the primary path, and is used to calculate the modification signals.

II. Primary Signal Path

The primary signal path starts with the inputting of RGB digital signals at an input, which may be respective 10-bit RGB output signals from a telecine, a VTR, or any other digital video signal.

The R,G,B digital signals may be supplied by a conventional input arrangement as shown in FIGS. 2A and 2B, which comprises an input decode and demultiplex unit 1, which receives RGB signals and outputs Y, U and V signals; an intermediate master saturation control which processes the U and V signals from the unit 1; and a digital matrix 2, the latter outputting the 10-bit R, G and B signals.

For pixels that are not intended to be modified, a completely transparent R,G,B signal path is provided from point B (or point A if the LUT's 3 are not set to modify the video signal) through the output of the convolver 7a(and further, through the LUT's 8 for legal video signals). For use with the RGB output from the Rank Cintel 4:4:4 URSA store, conversion between RGB and YUV is completely unnecessary. In any event, the conversion between YUV and RGB and vice versa at stages 1, 2, 9 and 10 in FIGS. 2A and 2B is essentially reversible and does not introduce errors in the normal case.

The R, G and B signals are then provided to respective primary lookup tables 3 (LUT's). These can be used, if desired, to perform the same functions as the conventional gain (white level), lift (black level), and gamma (contrast and midtone) controls of the telecine. They can also modify color. The primary lookup tables can modify all of the pixels in the entire picture. They can be used to perform "master" modifications (that is, modifications applied equally to the red, green, and blue channels resulting in a tonal change, but not a color change), by applying an identical modification to the red, green, and blue lookup tables. "Differential" modifications are accomplished by applying modifications to only one or two of the lookup tables. In this way it is possible to modify, for example, the gamma of blue only.

The primary LUT's 3 are preferably dual-ported RAM's, so that they can be loaded via one port, while the main signal processing function continues via the other port. Thus the LUT's 3 are capable of being reloaded between frames, which is known to those in this art as "dithering." Applying different LUT's to successive frames is useful for temporally breaking up grain and noise, for example.

One reason for replicating the functionality of the telecine controls with the primary lookup tables 3 is to be able to ouctom-load these tables and thereby accomplish a degree of control not available on the conventional telecine.

The primary lookup tables 3 are not essential to this invention, but are primarily a convenience for use in tape-to-tape transfers. They also may be used to control the response curves of the DCP in order to, for example, emulate a particular telecine. They are loaded by the DSP 4, which is controlled by a programmer/controller such as the POGLE controller described above.

The DSP (digital signal processor) 4 is a microprocessor of any conventional design which is capable of implementing an algorithm for producing a family of curves, dependent on the parameters of the algorithm. For example, a family of different parabolic curves can be generated by calculating in the DSP 4 the value of the output of the algorithm on a step-by-step basis for each step of the lookup table. For example, if the DSP is programmed with the equation of a straight line, a straight line is loaded into the lookup tables 3.

The lookup tables 3 are constructed by using RAM memory which is addressed by the input video signal. When the system is first powered up, the processor 4 associated with each lookup table writes an incrementing series of values at each address in the RAM. In other words, initially, the contents at a given address equals that address. Thus, when the video signal is applied to the address input of the RAM, the data output provides exactly the same hexadecimal value and so the video signal passing through the RAM remains unchanged.

However, at any time, the DSP 4 may calculate a different series of values to be written into the RAM for providing a translation of the video signal. By this means it is possible to transform any red value in an input signal, for example, into any other red output value.

At point B, after processing by the primary lookup tables 3, all of the corrected R, G and B signals, including those that are not to be modified, are provided (possibly downsampled) to the secondary signal path.

Next along the primary signal path is a digital delay 5, which may comprise one or more delay lines. In the disclosed embodiment, the delay 5 provides a time delay of two lines (2L). This delay gives enough time for the secondary signal path to calculate the modification signals, which will b used to modify the original signals.

After the delay 5, the modification signals are brought back into the main signal path at point C, and combined with the unmodified main signals by correction adders 6. The output signals from the adders 6 then form the 10-bit red, green, and blue modified digital outputs which are then filtered by the convolver 7a and subsequently outputted from the DCP.

Element 7 is a buffer frame store, which provides resynchronization of the video signal after processing. Video delay through the system is thereby arranged to be one TV frame. H and V output timing adjustments (not shown) are also provided.

The logic used to provide both primary and secondary color correction is pipelined for reasons of speed. This means that the signal at the output of the adders 6 is delayed in time relative to the input. In a studio environment this time delay would have disastrous consequences and so the frame store 7 is used to resyncronise the video output.

This frame store 7 is constructed using RAM configured as a FIFO memory, whereby data is written in using the input clock which has been passed through the pipelined stages discussed above. Some time later a regenerated clock locked to station reference is used to read out the data in a similar order, but in synchronization with system line and field timing.

A second frame store (not shown) is provided in parallel with the above to allow the operator to store a single frame of video for color matching. The input to this second frame store is switchable from various stages throughout the processing circuitry, allowing the colorist to compare between a corrected and uncorrected image. The output of the second frame store may be overlaid on the main video output by means of a WIPE control.

Convolver 7a receives the output of the frame store 7 and smooths it according to a known convolution scheme which is discussed below in connection with the convolver 17.

The convolver 7a output is passed to a lookup table 8 which is used to perform a clipping function on the RGB signal in order to ensure that improper or illegal values are not passed to the output. The lookup table may be updated at any time by a microprocessor (not shown), allowing different algorithms for clipping to be selected.

Element 8 is a clipping lookup table, which clips signals at their maximum or minimum values to prevent "rollaround", i.e. to keep the output within the 0–255 (8-bit) range. In addition, it is normally necessary to restrict the output to the 12–240 range, as required by the SMPTE standard for digital video, the reserved areas above and below this range being used for blanking and special effects. The LUT's 8 may be reconfigured under software control (not shown) to select either "hard-" or "soft-edged" clipping algorithms.

Finally the RGB signal is re-converted to YUV color space before being passed to the output multiplexer and the line driver stage. Use may be made once more of the above-discussed decoder/demultiplexer (in reverse) or an equivalent device to reconstruct the output signal in a similar format to that originally derived from the FDL90 or other telecine.

Element 9 is a matrix which converts, if necessary, from the RGB environment to a YUV (luminance-chrominance) environment. Finally, in the output encoder and multiplexer 10 the YUV signals are conventionally encoded and multiplexed for, e.g., broadcasting or recording.

III. Secondary (Modification) Signal Path

In the secondary signal path, the DCP produces respective modification signals for those pixels, and only for those pixels, which have the criteria indicating that they are to be modified.

A. Signal Conversion to (H,S,L)

The first step in the modification signal path is a digital matrix and coordinate translator unit 11 which converts the red, green, and blue signals into signals representing hue, saturation, and luminance. There are several commercial chips which can perform this function by use of publicdomain algorithms. In this case, the matrix first provides conversion from (R,G,B) to (Y,U,V). The Y signal becomes the final L signal. The coordinate translator converts from Cartesian coordinates (U,V) to cylindrical polar coordinates (H,S) by means of a lookup table in PROM.

Transformation from R,G,B signals into cylindrical color space (H,S,L) is described, for example, in R. W. G. Hunt, *The Reproduction of Color in Photography, Printing, and Television* (Fountain Press, Tolworth, England, 4th ed. 1987), ISBN 0-85242-356-X, at 114–121, incorporated by reference. In cylindrical color space, luminance is conventionally shown as a vertical axis. Planes which intersect this axis at right angles are planes of constant luminance. Planes of constant hue extend radially out from the axis, each having a hue angle. Saturation or amount of color is represented by the distance from the axis; thus, at the luminance axis there is no color.

One possible hardware implementation, incorporated by reference herein, utilizes first the TRW model TMC2272 chip, which transforms the incoming RGD to YUV, which is a color space comprising luminance (Y) and two mutually orthogonal chrominance vectors U and V. The second stage is the TRW model TMC2330 chip, which mathematically transforms from rectangular (Y,U,V) to polar coordinates (H,S,L). Both of these chips are also usable in the reverse direction for conversion from HSL to YUV to RCB.

H,S,L color space is conceptually convenient to use in practice. In contrast, the U and V vectors are difficult to imagine. The conversion from YUV to RGB to HSL is in two stages for convenience, as standard chips are readily available to do these two conversions, while no standard chip is readily available for converting directly from YUV to HSL. On the other hand, three-dimensional RGB color space is essentially cubical and therefore, it is advantageous to carry out the clipping functions by the LUT's 8 (and also the master transformations by the LUT's 3) in RCB space.

B. Pixel Identification Table

Following the conversion to H, S, and L, selected boundary conditions in this color space are inputted under operator control into a pixel identification table 15, which distinguishes the region of color space to be modified, from the region not to be modified. This technique will be referred to herein as "cache tagging". It involves defining a range of data bounded by particular data values. These ranges are "tagged" in a "cache tag RAM" (described below) for later use. As shown in FIGS. 2A and 2B, X, Y and T tags may be employed. At least H, S and L "tags" are employed in the preferred embodiment.

For each pixel, it is determined whether to "modify" or "not modify" that pixel by taking the logical AND of the output bits from the H,S,L, etc., cache tag RAMs, which are located with the predetermined criteria for selecting which pixels in the input signal are to be modified. If all of the output bits are "1", that will indicate that for that pixel, a modification signal will be generated, which will be added back into the main signal path later on.

As an example of this process, the DCP is capable of tagging only very narrow range of reds, which might be useful, for example, to improve the color of one piece of red clothing. All other "reds", and other colors including black, white and grey, remain untouched. By the same process, all of the colors in a multicolored piece of clothing can be selected simultaneously.

Advantageously, there is also a "master hue" or "wash" mode, wherein all of the pixels in the picture are marked to be changed, and then the hues or other attributes of all the pixels can be changed simultaneously.

"X" and "Y" tags can also be used in the cache tag RAMs, in order to represent the boundaries spatially (where X and Y are pixel and line addresses). X and Y tags can be inputted, by direct entry of X and Y addresses into the pixel identification table 15.

X and Y coordinates of a particular pixel are determined from the studio synch signal as seen at the left-hand portion of FIGS. 2A and 2B. Lines are counted by a line counter and pixels within each line are counted by a pixel counter. The line counter and pixel counter have outputs corresponding respectively to the Y and X coordinates of each pixel. The synch signal contains a frame reset signal which corresponds to X=0, Y=0 followed by a series of pulses for incrementing X, followed by a line reset signal (which resets X to 0 and increments the line number Y). The X and Y signals are made available to the pixel identification table 15. The availability of the X and Y coordinates of each pixel enables processing of each pixel "on the fly" in a very simple manner.

Alternatively, a conventional key input channel to the pixel identification table 15 is essentially a substitute for the cache tag RAM. (It could also be used in tandem with the X and Y tag RAM.) A conventional key input signal can be applied to the key input channel and ANDed with the H, S and L table outputs to control directly when the offsets from the offset table 16 are to be applied to a given pixel. As in conventional, the DCP and the source of the key input signal are coordinated by the common sync signal to which all of the studio equipment is normally connected. The key signal, again as is conventional, is a black-on-white or white-on-black picture signal (which may be rectangular or have any other shape) which can be used to control further equipment such as the offset table 16. A key input signal can be generated by a vision mixer such as the Abekas A84 and many other devices.

Also as seen in FIGS. 2A and 2B, the pixel identification table 15 can be employed to indicate selected pixels by means of a conventional key output signal on a key output channel, for controlling further equipment, rather than to select offsets from the offset table 15.

FIGS. 3 and 4 show the structure of the pixel identification table 15 in more detail. It comprises a cache tag RAM (or CTR) 150, which in this embodiment comprises at least hue, saturation, and luminance RAMs 150H, 150S and 150L, respectively. These may be supplemented by X and Y RAMs 150X, 150Y. Hue, saturation, and luminance components of each pixel are supplied by the digital matrix and coordinate translator 11 at point D as described above. Select signals SH, SS and SL are provided by the control panel or by a controller such as the POGLE controller and provide data to be entered into the RAMs 150H, 150S and 150L respectively, to indicate how pixels are to be selected for modification according to their hue, saturation and luminance (and optionally SX and SY signals, and/or other signals representing sharpness, texture, or another parameter). The entered selection criteria distinguish the regions to be modified from the regions not to be modified, and to generate control signals according to predetermined standards to control the DCP. The RAMs 150H, etc., will be described further below in more detail.

By means of a cursor, the operator of the DCP can point on a screen to a particular color, or to a physical region containing one or many colors. The programmer/controller will then provide (H,S,L) date and optionally (X,Y) or other data to the pixel identification table.

There are a plurality of channels (for example, 8 channels) each having a set of cache tag RAMs 150 which can thereby specify 8 modification sets. For example, 8 objects in a picture can be modified if they can be specified uniquely by a combination of H, S and L data, optionally supplemented by X and Y data, for example. The RAMs 150H, 150S and 150L are each 1K RAMs, i.e., RAMs having 1,024 address locations corresponding to a 10-bit input address. The CTR's can be implemented by standard components or by an application-specific integrated circuit (ASIC). By means of such RAMs, 1,024 individual degrees of hue, saturation and luminance can be defined. Thus, 3K bits can control $2^{30}$ (or 1,073,741,824) possible colors. Great color resolution can be controlled by means of a minimal amount of data.

FIG. 4 is a schematic diagram indicating a possible implementation of the hue CTR 150H. As an example, the bottom third of the addresses in RAM 150H could be designated to correspond to respective shades of red. The middle third could correspond to shades of green, and the top third of the addresses in RAM 150H could be designated to correspond to shades of blue. These designation are indicated by the letters D and R on the left side of FIG. 4. As seen therein, bits 4–13 are loaded with the value "1" and the rest of the bits are loaded with "0." Thus, a narrow range of shades of red that have been defined to correspond to bits 4–13 are being selected for modification. Every pixel is applied as an address to the hue CTR 150H in the pixel identification table 15. If a pixel's hue is binary 4 to 13 the output of the CTR 150 H will be 1, indicating that that pixel has a hue in that range of red shades. Those pixels will be modified according to a predetermined modification stored for that channel in the offset table 16.

If, in the preceding example, a pixel with that specific shade of red is to be selected regardless of its saturation and luminance, then the S and L RAM's 150S and 150L are loaded completely with 1's.

The H, S, and L table contents for a particular pixel are ANDed to determine whether that pixel will be selected for modification. For example, all pixels of a given hue, irrespective of the S and L, can be selected by loading selected locations in the H table with ones, and all of the S locations and all of the L locations with ones. Or, only certain combinations of H, S and L can be selected by only filling portions of each table, which need not be continuous, with ones. The cache tag RAM signals are ANDed, and therefore, only if all the criteria (H, S, L, X, Y, and any other criteria being used) are met, will that pixel be tagged for alteration.

Advantageously, there will be a macro feature on the controller to carry out any routine series of loading functions, such as, for example, setting up the DCP to select pixels of given hues, automatically loading all of the S and L locations with ones in order to disregard saturation and luminance.

In practice, it has been found advantageous for there to be default settings for the H, S and L tables. By default, all luminance values are selected by filling all locations in the L table with ones. Channels 1–6 are each loaded with ⅙ of the hue range. The top 95% of the saturation range is loaded with ones, in order to select substantially all colors, but not neutrals (which have zero saturation).

FIG. 5 shows a possible implementation of CTRs 150X and 150Y, which again are 1K RAMs. These two RAMs can be used to designate individual pixels, or rectangular regions that occur at intersections of X and Y ranges. The Y and X locations correspond respectively to lines and locations within line in the picture. Controlling spatial regions of a picture for modification with 1K RAMs for the X and Y coordinates is not a powerful a technique as using a 2-dimensional address memory, for example, but it is almost as useful and is still very powerful because again, with only 2K bits of data, one million distinct pixel locations can be designated. Thus, by this technique, the DCP can delineate, for example, a rectangular region of the picture to be modified (or not modified).

As an example of cache tagging, let us consider the example where we wish to modify all pixels in the picture with a "mid-range" value of luminance. In this example, the control panel will interpret its settings as an instruction to change pixels which have any value of hue, and any value of saturation, but a luminance value greater than a lower threshold L3, and less than an upper threshold L2. This will cause the luminance tag RAM to be loaded with zeros for the possible 10-bit values from 0 to L1. For example, if L1 is 256 (one-quarter range) and L2 is 768 (three-quarters range) then the first 256 values of the L cache RAM will be loaded with zeroes ("do not modify"). The addresses 257 to 767 will all be loaded with the value "1" ("modify"). The remainder of the cache tag RAM addresses (addressed 0 to 256 and 768 to 1023) will be loaded with zero ("do not modify").

It can be seen from this simple example that we can distinguish by this technique between any region in color space and any other region. Even if two regions have the same hue, they can be distinguished on the basis of luminance or saturation. For more complex cases, we can distinguish by logical combinations of H, S, and L limits (and/or X and Y addresses). Note that a range of a single parameter or a region of colors need not be contiguous. Thus, if 157 non-consecutive values of hue were to be modified, at those 157 hue-valued addresses in the hue cache tag RAM, there would be a "1". This demonstrates the enormous resolving power of the cache tag system.

As mentioned above, the architecture of the DCP provides for a plurality of independent channels. For example, 6, 8 or 10 channels may be sufficient for most purposes. FIG. 7 schematically shows 8 channels. Thus there can be eight "channels" with respective pixel identification tables 15, which are able to modify eight separately defined regions, colors, luminance ranges, etc. These regions can overlap.

In practice, all 8 channels of hue, for example, can be implemented with one 8K hue RAM. The hue RAM has 8 bits of data at each address, each bit corresponding to one hue address for one of the 8 modification channels.

The Hue CTR is structured in bytes as is normal for memories. Each bit of the 8-bit byte corresponds to one channel and represents either "select" or "not select" the particular hue which corresponds to that byte for that particular channel.

FIG. 7 shows the hue CTR in greater detail. FIG. 7 shows an 8K RAM where 8 channels (1H–8H) have been designated having 1K (1024) bits each. This will be presumed to be the H CTR, the S and L CTR's being identical. A given 10-bit H value of an input pixel is inputted to the CTR 150 H and is used as an address for addressing all 8 of the channels. If, for channel 1, the H, S and L CTR's all have 1 at a particular address corresponding to the input pixel's H, S and L value, then that pixel is said to have been "tagged" for alteration. Then, for that channel, the ΔH, ΔS and ΔL which have been preloaded, will be supplied from the offset table 16.

C. Priority Logic

The DCP pixel identification table 15 contains precedence logic 250 to resolve internal conflicts between channels about color modification. Many such conflicts will be avoided by the use of X and Y cache tag RAMs to specify a specific physical object whose color is to be modified, but even then, a conflict will occur when moving objects find themselves temporarily in the same X,Y region. To implement the priority logic, highest priority may be given to lower-numbered channels, and lower priority to higher-numbered channels. This is not a restriction on operational flexibility, as channels can be renumbered at will.

As an example, it might be desired to modify a particular red shade when it occurs in a traffic signal in a given scene, but not when it occurs in the clothing of a person walking near that traffic signal. The solution would be to give priority to a channel which specifies both clothing color and location, so that the red shade will not be modified unless it is at the proper location.

As another example, if it were required to make an image go monochrome, except for the rods in the picture, one channel of the DCP could be used to make all of the picture monochrome. Then, a second channel would be selected to identify reds, to prevent them from going monochrome. The second channel would be designated to have priority over the first channel.

Channel 1 is always the highest priority channel. An input pixel, for example, is applied first to channel 1. However, a given priority hierarchy can easily be modified by swapping the content of each channel with that of any other channel. The channel numbers assigned to each 1K bit array in the CTR are internally controlled and managed within the DCP.

The priority logic is shown in more detail in FIG. 8. For example, if channel 1 has been loaded to tag red colors and change them to blue, and channel 6 has been loaded to tag light colors and change them to dark, a pixel with a light red color will be corrected and changed to light blue by channel 1. It will not be corrected by channel 6, because channel 1 has priority. If the operator does not like this result he can reorder the priority by swapping the contents of channels 1 and 6. Channel 1 will become the light color channel and channel 6 will become the red channel. Thus, a light red will now be controlled by channel 1 and changed to dark red.

D. Texture and Sharpness Detection

The DCP can also sense and respond to texture. Texture can be sensed on the basis of an analysis of luminance values according to standard methods as described, for example, in Pratt at 503–511, incorporated by reference. Texture is detected by analyzing the luminance data in a series of lines in the pixel by known methods, according to criteria such as spatial frequency and randomness. A spatial correlation function is defined in equation 17.8-1 on page 506 in Pratt. No one pixel can define a texture. A group of pixels is needed to define a texture. Pratt recommends a window of about 6×6 pixels to define texture, at page 507.

Likewise, sharpness can be detected even more simply. Page 319–325 of Pratt displays a method for detecting sharpness. Simply described, looking at a 3×3 window of pixels, if all of the pixels are similar to one another, the area is not very sharp, whereas if there is a large difference between one area of the window and another, then that area is considered sharp.

FIG. 9 shows an alternative cache tag RAM which can be set up for responding to texture. Address ranges in the RAM are arbitrarily assigned to correspond to different types of texture.

As seen in FIG. 2, luminance data are loaded into a multi-line store 11a and then the data in the store 11a are analyzed by a texture evaluator 11b. The time delay provided by the delay 5 is adjusted to accommodate the cycle time of the store 11a. Depending on what texture is detected, a predetermined 10-bit word can be outputted as a T signal to the pixel identification table 15. If the output of the texture evaluator 11b is, for example, binary 512, indicating a brick-like texture, then when that word is applied as an address to the texture RAM shown in FIG. 9, a 0 is found to be entered at address 512. Therefore, the particular group of pixels being analyzed for their texture will not be selected for any modifications. On the other hand, if the texture of paving stone is detected, then an output number, for example, binary 256 will be outputted to the pixel identification table 15. As seen in FIG. 9, address 256 has a "1". Therefore, the output from the texture RAM will be 1. This output is "ANDed" with the respective output of the H, S, L, X and Y RAMs, and if the ANDed result if "true" then it is determined that the pixels then being detected for texture have been tagged for modification.

E. User Interface

The user interface of the DCP is designed for "user-friendliness". When initially turned on, it emulates prior 6-vector secondary color correctors such as the RCA Chromacomp, which merely give the operator direct control over the relative proportions of six specific colors, the primaries (red, green and blue) and the secondaries (cyan, magenta and yellow). Operators have come to think in terms of those six colors. The Da Vinci gave greater control, dividing the color circle into 16 hues, but still, the Da Vinci controlled only hue. In contrast, the DCP also controls luminance, saturation and other picture attributes.

To make the DCP more user-friendly, its user interface initially displays six channels configured as a standard six-channel color corrector. In contrast to the standard corrector, however, the locations of the six vectors are not fixed, but rather can be "steered" so that each of the six channels can control any desired color. In the preferred embodiment, two additional channels are provided as well, giving a total of eight channels, although those last two channels are not initially displayed, but instead may be activated manually.

For example, the initially displayed red, magenta and yellow channels could all be "steered" to control three different shades of red. The operator might then wish to use the additional channels 7 and 8 to control magenta and yellow.

Figure 10:
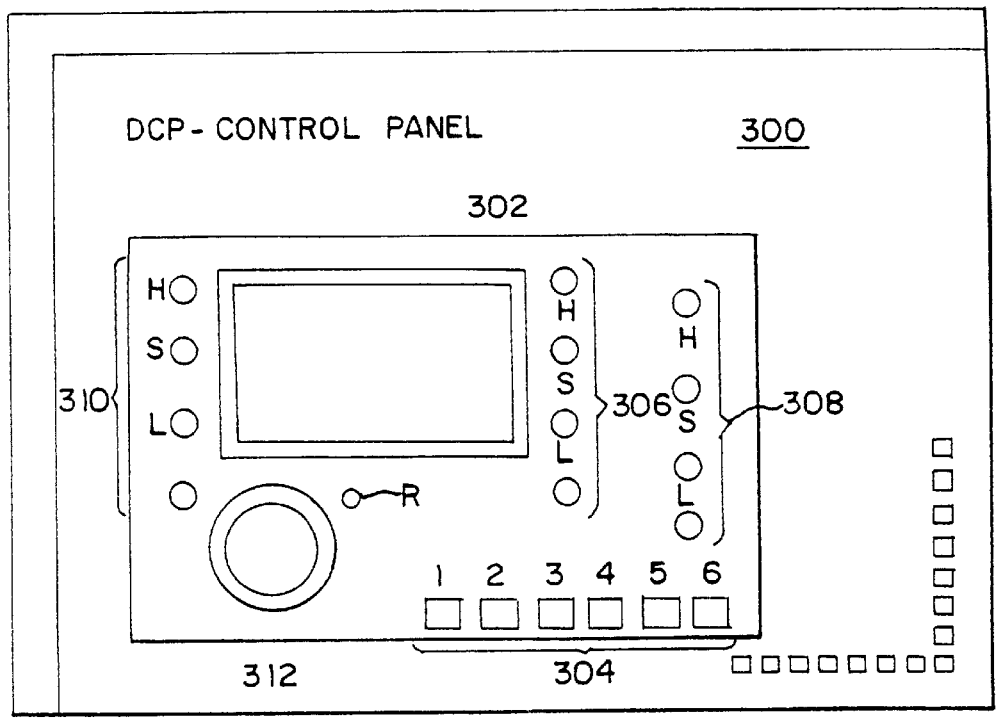
FIG. 10 is a simplified illustration of the control panel of the DCP.

The control panel 300 of the DCP is shown in FIG. 10. As seen therein, there is an electroluminescent display panel 302, which may be a color or monochrome liquid crystal display. The EL panel 302 displays the current selected parameters. Preferably the EL panel 302 is also touch-sensitive. The control panel 300 can be used in a free-standing mode to manipulate color and the other parameters that the DCP operates on. However, as in most post-production devices, the usual mode of operation will be under the control of a programmer/controller such as the POGLE.

A group of six buttons 304 correspond to the six channels that are initially available according to the preferred embodiment of the invention. A group of dials 306 (preferably rotary encoders) are provided for setting the upper boundaries of selected H, S, or L ranges, while a second group of dials 308 are provided for setting the corresponding lower bounds of the selected ranges. Extra dials are provided which can be set for detecting sharpness, location, texture, etc. Output H, S, L controls 310 are also provided to set, e.g., the amount of correction to be applied to H,S,L or another attribute.

A trackball 312 is a universal device which can point and click on any menu option. All of the above functions, including those that correspond to control buttons, are also accessible by means of the trackball, as well as via the touch screen 302 when the menu options are displayed on screen. Likewise, the trackball and/or touch screen are used to control the seventh and eighth channels which are available in the preferred embodiment of the invention, but are not initially activated upon power-up. A reset button R is also seen in FIG. 10.

F. Relative Tag RAM

A modification of the disclosed architecture would have a relative or "grey" tag RAM, instead of "binary". Instead of the disclosed architecture (FIG. 6A), wherein the cache tag RAM provides a binary lookup for each channel, giving the limited capability of tagging colors to "modify" or "not modify," there would be a relative or "grey" value (FIG. 6B), for example in a range of binary 0–8, at each location in the H, S and L offset tables. Relative modifications would help to avoid the possibility of a discontinuity at a boundary between colors that are modified and not modified (in the absence of a convolver or some other facility for smoothing the boundary).

The grey level cache tag RAM would avoid such a discontinuity, by marking each specific shade with an indication of how much it is to be modified. For example, mid-reds could be tagged to be strongly modified, while light and dark reds would be tagged for a slight modification. This would improve the naturalness of the resulting picture.

Figure 12:
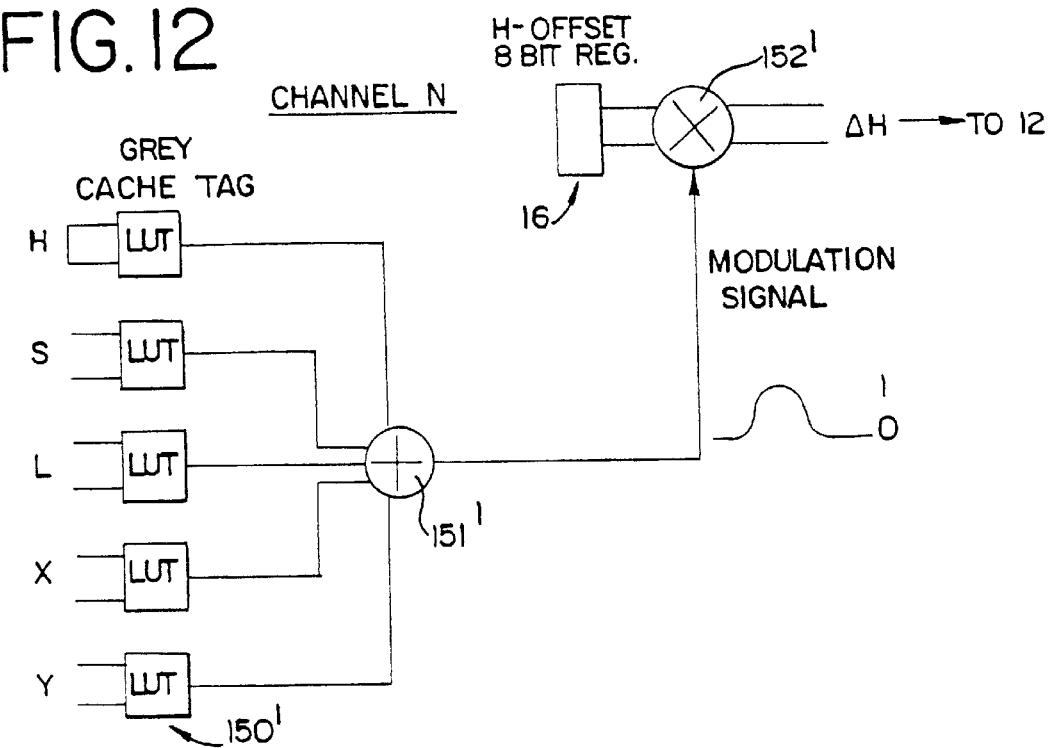
FIG. 12 is a schematic block diagram showing a first form of a relative or grey-level cache tag RAM.

FIG. 12 illustrates the operation of a relative or "grey-level" cache tag RAM of the type shown schematically in FIG. 6B.

Figure 11:
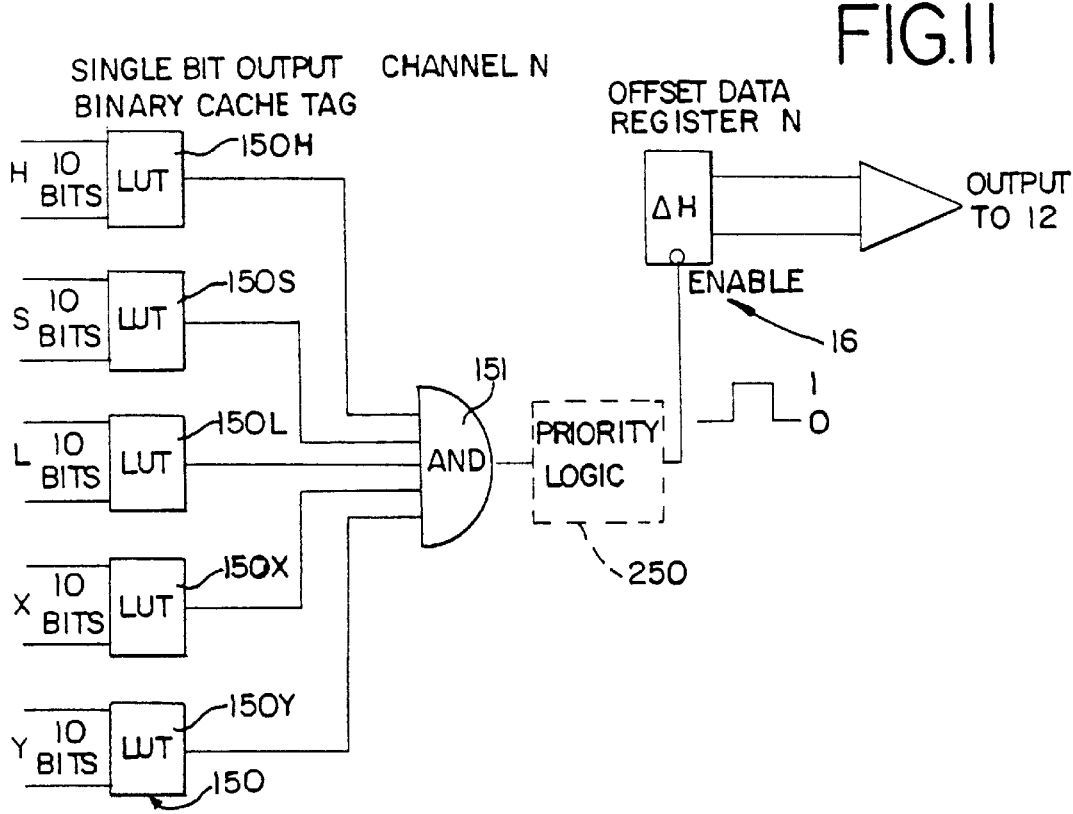
FIG. 11 is a logic diagram showing a set of cache tag RAMs corresponding to various pixel attributes for one channel, and the priority logic, in the pixel identification table 15, as well as the offset register for hue for that channel within the offset table 16.

By comparison, the preferred embodiment, as shown in FIGS. 2, 3, 6A and 11, for example, employs a binary or "tag/no tag" RAM. Pixels are either tagged for alteration or they are not tagged. Thus the output of the AND gate in FIG. 11 is either a 1 or a 0.

FIG. 11 shows the respective single-bit H,S,L,X and Y RAM's (lookup tables) 150H, 150S, . . . , that are part of a single channel N of the DCP. For a given pixel, the respective H,S,L,X and Y data for that pixel are applied to the lookup tables of channel N, and the outputs thereof are ANDed by an AND gate 151. Assuming that channel N is given priority by the priority logic (FIGS. 3 and 7), then the respective offsets in the offset data registers N, corresponding to channel N, will be outputted to the combiners 12. Only the ΔH offset register N is shown in FIG. 11. The contents of the ΔH offset register N are not modified in any way.

According to the variation in FIG. 12, in contrast with FIG. 11, a spectrum of light, medium and heavy tagging and in-between levels is provided. The H,S,L,X and Y registers tag with a byte rather than a bit, for example a 3-bit byte as shown in FIG. 6B. The outputs of the respective registers in response to a given input pixel may vary from binary 0 to 7. These outputs are added by the adder 151' to obtain a smoothly variable modulation signal. The content of the offset register 16 for the corresponding channel is, for example, a constant and is multiplied at 152' by the modulation signal to obtain the output ΔH for the combiners 12.

Figure 13:
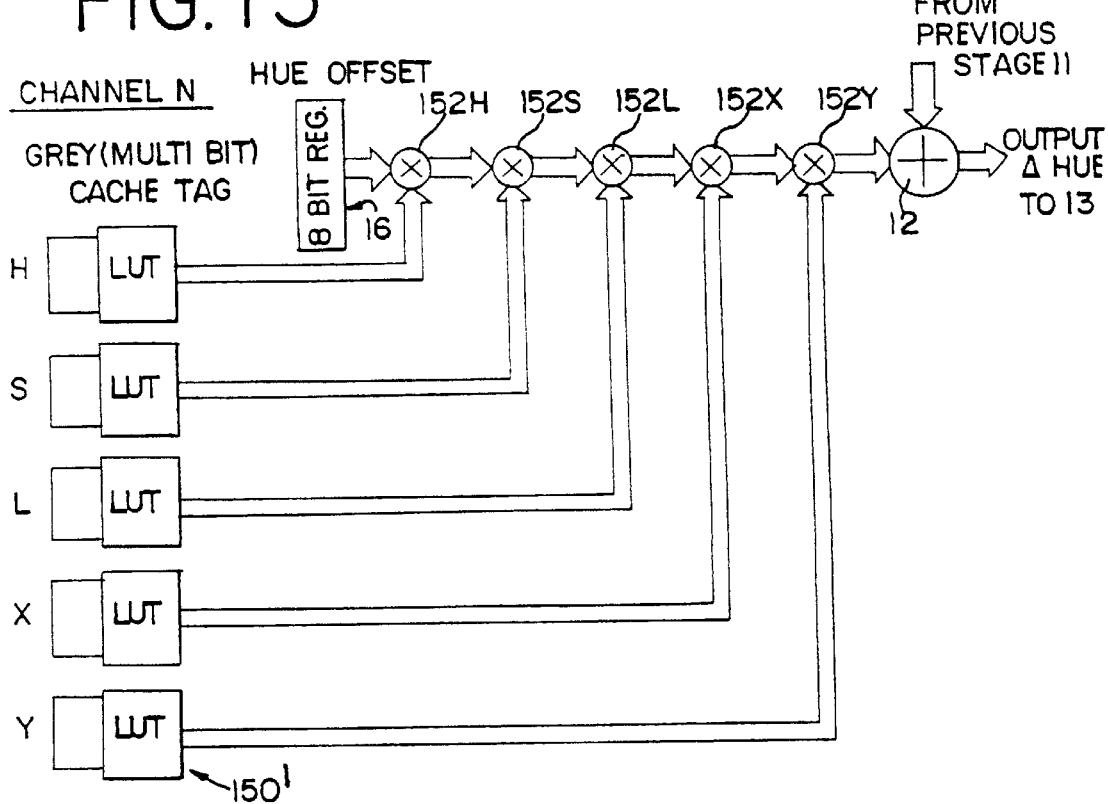
FIG. 13 is a schematic block diagram showing a second form of a relative or grey-level cache tag RAM.

A further, more complex variation is seen in FIG. 13, with cross-modulation of signal attributes. The H,S,L,X,Y registers 150' and the channel offset register 16 for channel N are the same as those in FIG. 12. However, the constant output of the offset register 16 is combined with the outputs of the registers 150' by a plurality of multipliers 152H, 152S, 152L, 152X, 152Y which are arranged in series.

the embodiments of FIGS. 12 and 13 enable the DCP to modulate the replacement hue, for example, as a function of saturation, luminance, etc. The embodiment of FIG. 13 can be expected to give finer control.

For example, in the binary pixel identification table of FIG. 11, a certain range of red hues may be selected for alteration, and other red hues will not be altered. If high ranges of saturation and luminance parameters are also selected, then since the respective hue, saturation and luminance RAM outputs are ANDed, that given range of red hues will be selected and altered only when they have, for example, high luminance and high saturation.

In contrast, in the relative or grey level cache tag RAMs in FIGS. 12 and 13, it is possible not merely to modify or not modify, but rather, to apply light, medium, or heavy modifications, or levels in between. The relative output values from the luminance and saturation RAMs in FIG. 12 will be added with the hue output value, and the resulting signal will be used to modify the contents of the offset register 16. The embodiment of FIG. 12 is somewhat less expensive, in that only one adder 151' and one multiplier 152' are required. On the other hand, the embodiment of FIG. 13 is more expensive, requiring at least five multipliers, but is mathematically appropriate and can be expected to give finer control.

Figure 14:
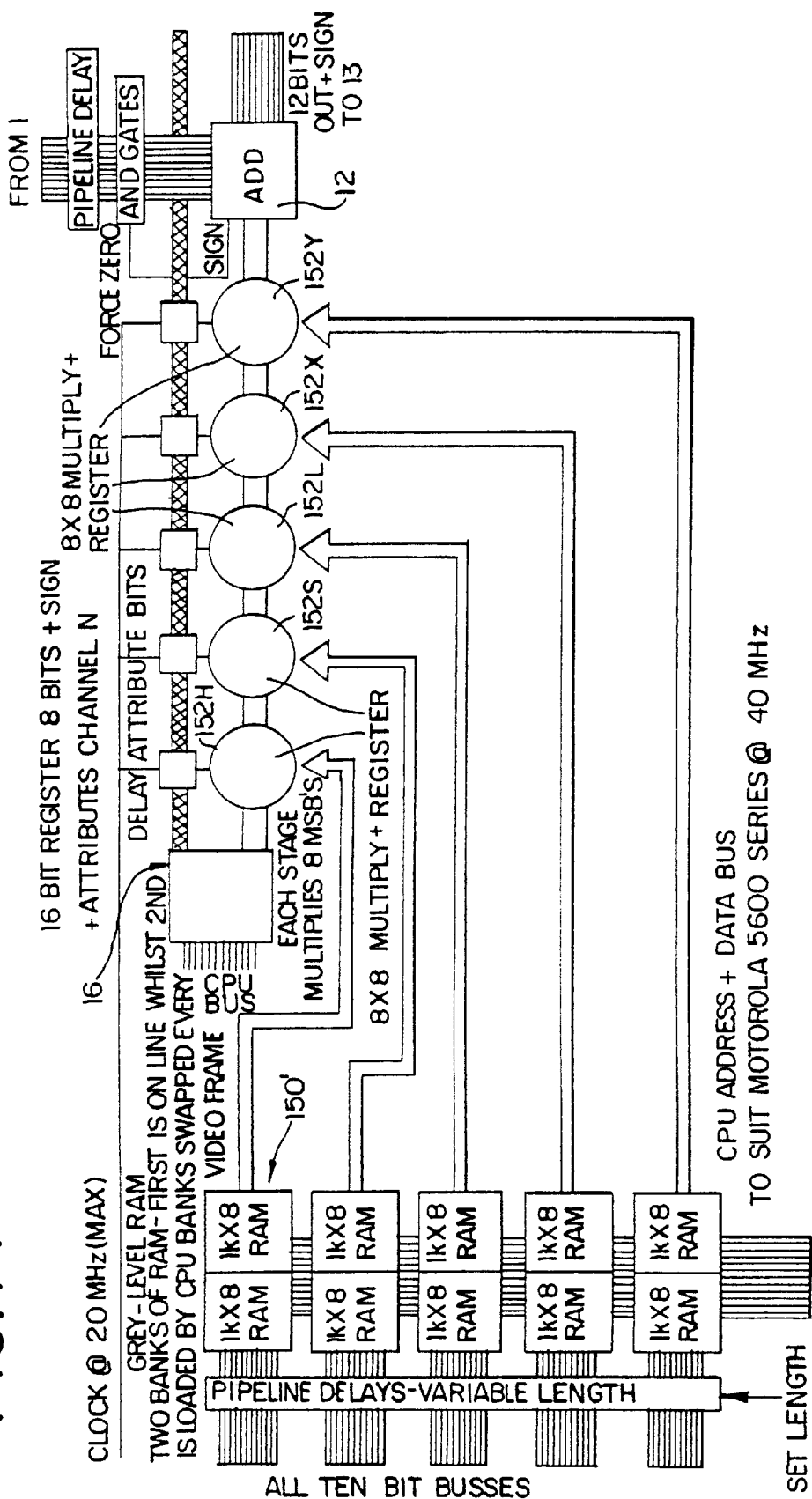
FIG. 14 is a more detailed block diagram corresponding to the arrangement of FIG. 13.
Figure 15:
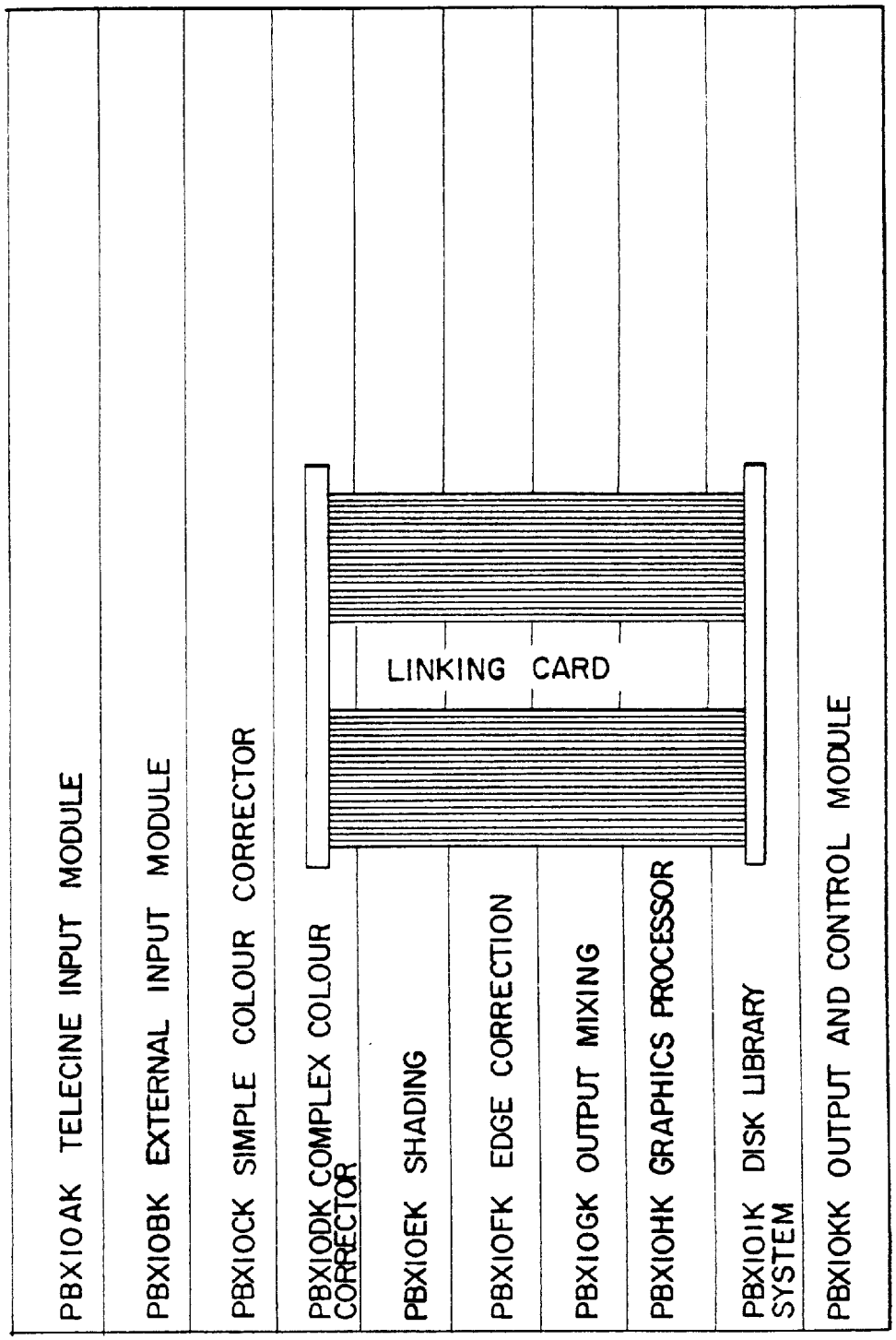
FIG. 15 shows a card rack arrangement in a practical embodiment of the DCP.
Figure 16:
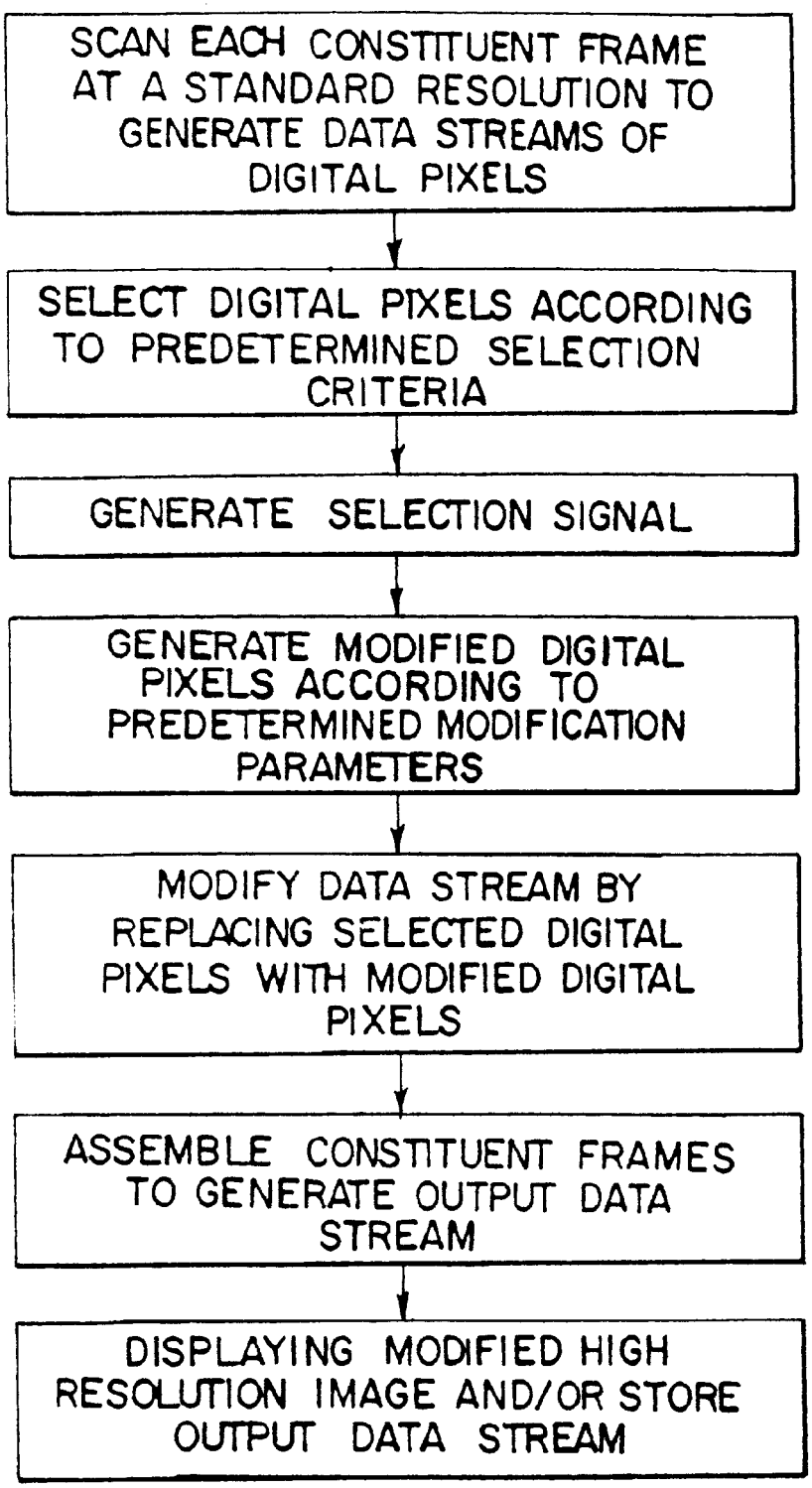
FIG. 16 is a flow chart illustrating a method operating in accordance with a preferred embodiment of the present invention.

FIG. 14 shows the hardware implementation of the embodiment of FIG. 13 in more detail.

G. Offset Table

Having identified the regions to modify and not to modify with the pixel identification table 15, the amount those regions are to be modified is then specified by the offset table 16, which in this embodiment of the invention provides respective H, S, and L offsets. See FIG. 13. The offset table 16 is a series of registers which are addressed by the output from the CTR 15, only one being shown in FIG. 11.

The offset RAMs hold an H offset, S offset, and L offset for each H, S, and L value to be modified in each channel. The starting value in each register for each channel is zero. The operator can increase or decrease these values by means of rotary controls.

As a simple example, assume that a video scene contains two differently colored objects, for example a red car and a yellow car. It may be desired to change the yellow car to red, to match the color of the red car. The operator specifies the channel in which the hue of the yellow car is to be stored, and identifies the yellow car by storing the exact hue value of the yellow car within the pixel identification table 15. In practice, the operator can position a cursor on the yellow car and the hue of the yellow car will be stored automatically. Then, the operator inputs an appropriate color offset in the channel of the offset table 16 corresponding to the yellow car's channel in the pixel identification table 15. To do this, the operator selects the channel of the yellow car and rotates an appropriate control for incrementing or decrementing the hue register for that channel, until the correct value is found, such that the color of the yellow car now matches the color of the red car. Then the operator manually stores that offset value in the offset table 16 with a control on the DCP. Having set up the pixel identification table 15 and the offset register 16 in this way, the circuitry will react to each pixel having the identified yellow hue that appears within the video signal, causing the stored offset for that channel to be added to the hue value of that pixel by the adder 12. Thus the output of this stage will cause all pixels having that yellow hue to be changed to red pixels.

X and Y offsets can also be supplied if it is desired to modify the X and Y coordinates of a pixel.

The offset table can also be employed to modify the sharpness of a region, for example in response to a particular texture or sharpness detected by the texture evaluator. For that purpose, the offset table 16 would be loaded with appropriate data for setting the convolver 7a to modify the sharpness of that region, according to a known process. Such a process is performed by known Rank Cintel telecines, which employ a single number as an input to a convolver to control sharpness or softness.

One advantageous use of sharpness modifications by means of the convolver 7a might be as follows. It might be necessary to remove the "beating" or a high-frequency, shiny car radiator grill. It would be possible to detect the region to be altered (the car radiator) by its high luminance. Then, having detected that region, the convolver 7a would be supplied with data from the offset table 16 causing it to modify the sharpness of that region, to blur it slightly and remove the beating effect from the final picture.

As a further improvement on the foregoing example, it would be possible to select the radiator but avoid inadvertently selecting the sky, which also has high luminance. By ANDing the sharpness parameter and the luminance parameter, the car radiator would be selected, because it has both high luminance and high sharpness; but high-luminance, low-sharpness regions such as the sky would not be selected.

In other words, the pixel identification table 15 is loaded with data for a given channel to identify regions of high luminance. The offset table 16 is loaded with a parameter to control the degree of smoothing applied to those regions for that given channel, and that parameter is supplied to the convolver 7a and employed for smoothing the output of the DCP. In this example, it is only desirable to smooth certain areas of the picture, namely those areas that have been selected for modification. It would be undesirable to smooth the entire picture, which would make it look soft and lose picture detail. Therefore, the convolver 7a is only activated for those regions that have been selected for modification. To summarize, the pixel identification table 15 selects where to convolve, while the offset table 16 controls how much to convolve.

H. Signal Modification

These offsets are then combined with the original H, S, and L values of the original (possible downsampled) signal by means of combiners 12, by specific rules; namely, H offsets are added, while S and L offsets are multiplied. Although these rules are not absolutely necessary to carry out the invention, it has been found experimentally that following these rules gives the most natural appearance. H corresponds to a phase angle or vector, while S and L are magnitudes. So, for example, multiplying either S or L by a modification factor of +N% will give the same apparent degree of modification for both large and small starting values of S and L, which is desirable. On the other hand, since H is a phase angle, the H modification amount should be added, not multiplied, in order to obtain results independent of the starting value.

The resultant modified H, S, and L signals are then converted to modified red, green, and blue signals R', G' and B' by a digital matrix and coordinate translator 13.

At this point, this modified signal could be sent direct to the output. However, that would be undesirable for at least two reasons. First, the entire video signal has been processed twice, to convert from RGB to YUV to HSL to YUV and back to RGB. Even with the use of digital circuitry, there are cumulative mathematical errors within this process that would cause distortion to the entire video signal, whether or not color-corrected. Second, as the color correction has been performed in HSL color spade, it is possible that illegal combinations of color may have been introduced into the RGB signal after passing through the output matrix. In order to overcome these problems a further processing stage is used.

The output of the unit 13 is provided to a combiner 14. The combiner 14 compares the newly modified RGB signal to the original RGB signal that has not passed through the processing loop. The combiner looks for differences between the two signals and performs two separate functions simultaneously: (a) the combiner has knowledge of which pixels should have been modified, by checking the output of the pixel identification table 15. It therefore assumes that any differences, if no channel was selected, are due to mathematical errors and these can therefore be removed; and (b) the modified RGB signal (and with mathematical errors removed) is subtracted from the original RGB signal to produce an error signal.

The combiner 14 takes the values R', G', B' and subtracts from them the original R, G, and B from point B (or vice versa), to obtain modification signals ΔR, ΔG and ΔB. The modifications signals are then compared with the original ΔH, ΔS and ΔL by the combiner 14 so as to avoid unintended modifications. For example, if the offset signals ΔH, ΔS and ΔL are zero, then no modification was intended and the ΔR, ΔG and ΔB outputs from the combiner 14 are forced to zero. It is assumed that if they are non-zero, that is merely the result of small limited-precision mathematical errors that arose in the units 11–13 or elsewhere. This feature contributes substantially to keeping input signals free from corruption if they are not intended to be modified. Known ESCC's would propagate such small errors, resulting in slight modifications of the picture where none was intended.

It is these error signals ΔR, ΔG, ΔB which are used to modify the original clean RGB signal which is timed to then be passing through the delay stage 5.

Then these modification signals are applied to a convolver 17. A well-known convolution technique that may be employed is disclosed in William K. Pratt's book *Digital Image Processing* (John Wiley & Sons 1978), ISBN 0-471-01888-0, at 319 and 322–325, incorporated by reference. In the disclosed technique, which is only one of many available for removing noise or artifacts, each pixel is sequentially examined, and placed at the center of an imaginary 3×3, 5×5, or similar pixel array. If the L, for example, of the pixel is mathematically greater than the average of its immediate neighbors by some threshold level, it is replaced by the average value.

I claim:

1. A method of providing color modification to a plurality of photographic film frames at a specified resolution, a video image of a photographic film frame at the specified resolution defining a predetermined number of pixels, said method comprising, for each given film frame, in combination:

scanning each of a plurality of constituent frame portions of said film frame and thereby generating for each constituent frame portion a respective data stream of digital pixels representing a portion of a video image of the film frame at the specified resolution, the digital pixels in each data stream being only a portion of the predetermined number of digital pixels sufficient to produce a corresponding portion of the video image of the film frame at the specified resolution, whereby a combination of the data streams of digital pixels represents a complete video image of the film frame at the specified resolution, said digital pixels including data representative of at least hue, saturation and luminance of pixels in a respective constituent frame portion;

selecting digital pixels in one or more of said data streams according to predetermined selection criteria, said predetermined selection criteria for a digital pixel comprising data indicative of one or more color characteristics selected from the group consisting of hue, saturation and luminance of said digital pixel;

generating a selection signal indicating the selection of a digital pixel if said digital pixel meets said predetermined selection criteria;

responsive to said selection signal, generating a respective modified digital pixel in response to each selected digital pixel according to predetermined modification parameters;

in each data stream that contains at least one selected digital pixel, replacing each of said selected digital pixels with a respective modified digital pixel, thereby modifying said data stream; and subsequently assembling said constituent frame portions by combining said data streams to generate an output data stream representing a modified image of said film frame at the specified resolution.

2. A method as claimed in claim 1, wherein a constituent frame portion comprises a plurality of interleaved sections of said film frame.

3. A method as claimed in claim 1, wherein scanning each of a plurality of constituent frame portions of said film frames comprises scanning said film frame in an interleaved fashion.

4. A method as claimed in claim 1, further comprising scanning said film frame to produce a video image of said film frame at a resolution lower than said specified resolution and displaying said video image at said resolution lower than said specified resolution on a monitor for viewing by an operator.

5. A method as claimed in claim 1, further comprising storing frame-correlation information indicating a relationship between said consistent frame portions, and wherein assembling said constituent frame portions is based at least in part on said frame-correlation information.

6. A method as claimed in claim 1, wherein, according to said predetermined selection criteria, at least one of said data streams does not include any selected digital pixels and, consequently, said at least one data stream remains unmodified.

7. A method as claimed in claim 1, further comprising storing said output stream.

8. A method as claimed in claim 1, further comprising displaying said modified image.

9. A method as claimed in claim 1, wherein said predetermined selection criteria for a digital pixel comprises data indicative of one or more characteristics selected from the group consisting of hue, saturation, luminance and location of said digital pixel.

10. A method as claimed in claim 1, wherein selecting digital pixels in one or more of said data streams further comprises evaluating a texture of the pixels in the respective constituent frame portion represented by said digital pixels, and wherein said predetermined selection criteria indicates a particular texture for which corresponding pixels are to be selected.

11. A method as claimed in claim 1, further comprising:

supplying modification data for modifying said selected digital pixel according to said predetermined modification parameters; and combining said modification data and said selected pixel, thereby generating said modified digital pixel.

12. A method as claimed in claim 11, further comprising determining whether a difference between a modified digital pixel and a corresponding selected digital pixel is below a predetermined threshold and, if so, not supplying said modified digital pixel so that said selected digital pixel is not replaced.

13. A method as claimed in claim 12, further comprising disregarding said modified digital pixel if said difference is below said predetermined threshold.

14. A method as claimed in claim 11, further comprising detecting whether first transition values between respective digital pixels in a modified data stream exceed predetermined first transition limits and, if so, reducing said first transition values in said modified data stream.

15. A method as claimed in claim 14, further comprising detecting whether second transition values between respective modified digital pixels exceed predetermined second transition limits and, if so, reducing said second transition values.

16. A method as claimed in claim 15, comprising convolution.

17. A method as claimed in claim 11, further comprising detecting whether transition values between respective modified digital pixels exceed predetermined transition limits and, if so, reducing said transition values.

18. A method as claimed in claim 17, comprising convolution.

19. A method as claimed in claim 1, wherein selecting digital pixels and generating a selection signal comprises testing individual digital pixels according to said predetermined selection criteria.

20. A method as claimed in claim 1, wherein selecting digital pixels and generating a selection signal comprises testing predefined groups of pixels according to said predetermined selection criteria.

21. A method as claimed in claim 1, further comprising:
   storing sets of selection criteria; and
   storing respective modification parameters for each of said sets of selection criteria.

22. A method as claimed in claim 21, further comprising storing decision data indicative of which set of modification parameters will be associated with given selected digital pixels when said given selected digital pixels meet a plurality of selection criteria corresponding to a plurality of sets of selection criteria.

23. A method as claimed in claim 1, wherein said predetermined selection criteria are stored in a pixel identification table.

24. A method as claimed in claim 23, wherein said pixel identification table is modifiable by a user.

25. A method as claimed in claim 24, further comprising amending said predetermined selection criteria to change a selection of digital pixels for modification.

26. A method as claimed in claim 1, wherein said predetermined selection criteria and said predetermined modification parameters call for adjusting color of a pixel in a first constituent frame portion based on characteristics of a pixel in a second constituent frame portion.

27. A method as claimed in claim 26, wherein said predetermined selection criteria and said predetermined modification parameters call for adjusting color of a pixel in said film frame based on characteristics of a pixel in another film frame.

28. A method as claimed in claim 1, wherein modifying said data stream comprises concealing a scratch in said high resolution image.

29. A method as claimed in claim 1, further comprising:
   supplying to a frame correlator data identifying the digital pixels to be modified, the frame correlator establishing which data streams of digital pixels contain pixels to be modified, and
   supplying to a color modification apparatus the data streams of digital pixels which contain pixels to be modified, the color modification apparatus carrying out the color modification of the pixels to be modified in accordance with the color modification parameters.

30. A method as claimed in claim 1, wherein the scanned representations of the entire images on the film frames which are reviewed by an operator are provided by carrying out a plurality of partial scans of each film frame, each partial scan covering only a part of the film frame, so as to provide data representing a corresponding plurality of portions of a video image of the film frame which are combined to create a complete video frame at said specified resolution, said complete video frame at said specified resolution being displaying for review by the operator.

31. A method as claimed in claim 1, wherein scanned representations of the entire images on the film frames which are reviewed by an operator are provided by a preliminary step of carrying out on each film frame a single scan of the entire film frame so as to provide a complete video frame at a resolution lower than said specified resolution, said complete video frame being displayed at said lower resolution for review by the operator.

* * * * *